United States Patent [19]
Fujieda et al.

[11] Patent Number: 5,361,213
[45] Date of Patent: Nov. 1, 1994

[54] CONTROL DEVICE FOR AN AUTOMOBILE

[75] Inventors: Mamoru Fujieda; Minoru Ohsuga; Toshiharu Nogi; Yoshishige Ooyama, all of Hitachi, Japan

[73] Assignee: Hitachi, Ltd., Tokyo, Japan

[21] Appl. No.: 37,732

[22] Filed: Mar. 24, 1993

Related U.S. Application Data

[63] Continuation of Ser. No. 649,014, Jan. 31, 1991, abandoned.

[30] Foreign Application Priority Data

Feb. 9, 1990 [JP] Japan .................................. 2-028291

[51] Int. Cl.$^5$ .............................................. F02P 5/15
[52] U.S. Cl. ........................... 364/431.08; 364/431.04; 123/416; 123/436; 395/905
[58] Field of Search ....................... 364/431.08, 431.07, 364/431.04; 123/419, 436; 395/21, 22, 905

[56] References Cited

U.S. PATENT DOCUMENTS

| | | | |
|---|---|---|---|
| 4,381,748 | 5/1983 | Eckert et al. | 123/414 |
| 4,617,895 | 10/1986 | Sakakibara et al. | 123/425 |
| 4,671,235 | 6/1987 | Hosaka | 123/352 |
| 4,710,881 | 12/1987 | Mouri et al. | 364/431.08 |
| 4,735,161 | 4/1988 | Kaneko et al. | 123/361 |
| 4,868,755 | 9/1989 | McNulty et al. | 395/905 X |
| 4,896,639 | 1/1990 | Holmes | 123/419 |
| 4,971,007 | 11/1990 | Gopp et al. | 364/431.08 X |
| 5,041,976 | 8/1991 | Marko et al. | 364/424.03 |
| 5,044,195 | 9/1991 | James et al. | 73/117.3 |
| 5,089,963 | 2/1992 | Takahashi | 364/424.1 |
| 5,093,792 | 3/1992 | Taki et al. | 364/431.01 |
| 5,099,428 | 3/1992 | Takahashi | 364/424.1 |

FOREIGN PATENT DOCUMENTS 63250216 2/1989 Japan .

OTHER PUBLICATIONS

Caudill, "Using Neural Nets: Representing Knowledge," AI Expert, Dec. 1989, pp. 34–41.
Anderson, "Learning to Control an Inverted Pendulum Using Neural Networks," IEEE Control Systems Magazine, Apr. 1989, pp. 31–37.
Proceedings of the 1989 American Control Conference, Pittsburgh, Pa., 21–23 Jun. 1989, pp. 62–67; K. Ramanswamy et al. "Neutral Networks in GTA Weld Modeling and Control", p. 63, Column 2–p. 66, Column 2, Line 30.
IEEE ASSP Magazine, Apr. 1987, pp. 4–22, IEEE, New York, US; R. P. Lippmann: "An Introduction to Computing With Neural Nets".
Proceedings of the 1989 IEE International Conference on Systems, Man and Cybernetics, Cambridge, Mass., 14–17 Nov. 1989, vol. 1, pp. 315–320, IEEE, New York, US; D. J. Sobajic et al.: "Robust Control of Nonlinear Systems Using Pattern Recognition".
IEEE Transactions on Automatic Control, vol. AC–26, No. 3 Jun. 1981, pp. 638–645, IEEE, New York, US; G. N. Saridis: "Application of Pattern Recognition Methods to Control Systems".

*Primary Examiner*—Vincent N. Trans
*Attorney, Agent, or Firm*—Ladas & Parry

[57] ABSTRACT

A control device for an automobile has at least one sensor for detecting an operational state of the automobile. An output from the sensor is applied to a sample and hold circuit which is adapted to provide a time displaced output to a hierarchical group of neural elements. The neural elements operate upon said time displaced signals by varying the weighting of the signals and/or threshold values of the neural elements in accordance with a desired output parameter. The output of the neural computer is applied to a control circuit which is adapted to control an automobile actuator. The hierarchical group of neural elements are provided with numerous forms of different learning functions so that the desired output parameter is achieved. In one such embodiment desired parameters are applied to said neural computer and to a comparator, signals derived from sensors associated with automobile actuators are also applied to said comparator whereby difference signals are outputted from said comparator to control the weighting and/or threshold levels of the neural elements. The invention may be applied to different functions such as controlling air/fuel ratio, ignition timing, knock control, sensing, suspension adjustment, and road surface detection.

22 Claims, 27 Drawing Sheets

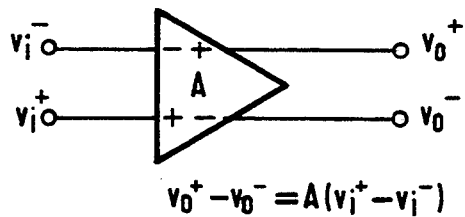
Fig.12 $v_o^+ - v_o^- = A(v_i^+ - v_i^-)$
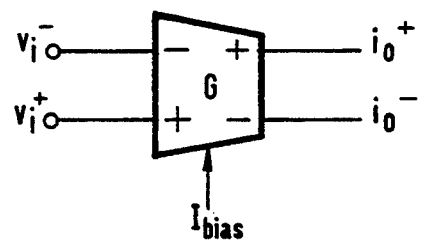
Fig.13 $i_o^+ - i_o^- = G(v_i^+ - v_i^-)$
$G = g(I_{bias})$
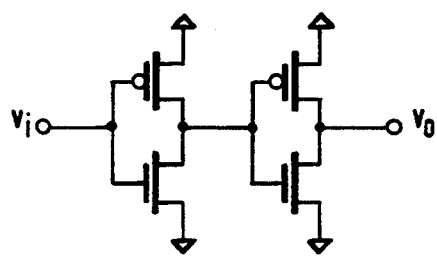
Fig.14
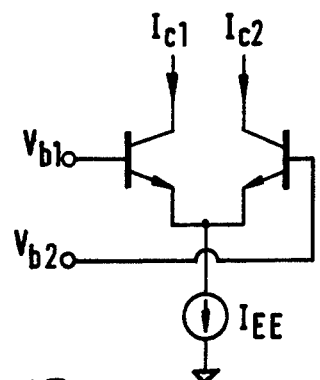
Fig.15 $I_{c1} - I_{c2} = KB \cdot tanh[DB(V_{b1} - V_{b2})]$
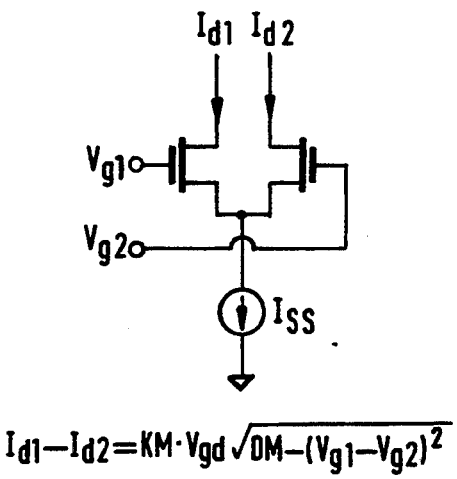
$I_{d1} - I_{d2} = KM \cdot V_{gd} \sqrt{DM - (V_{g1} - V_{g2})^2}$
Fig.16
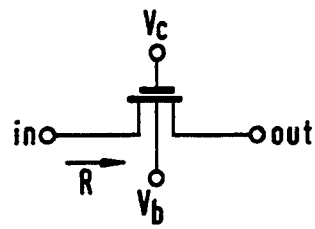
$R = \dfrac{1}{K(V_c - V_b)}$
Fig.17

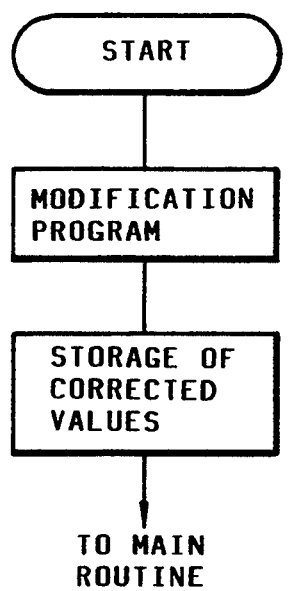
Fig.30(a)
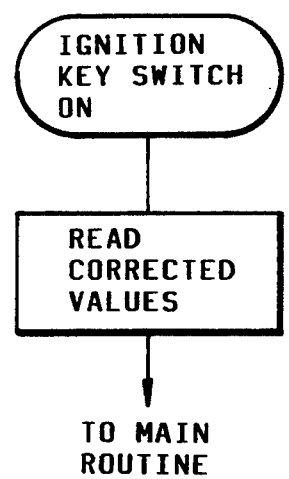
Fig.30(b)
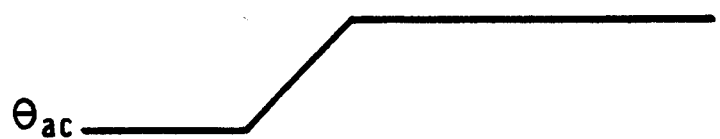
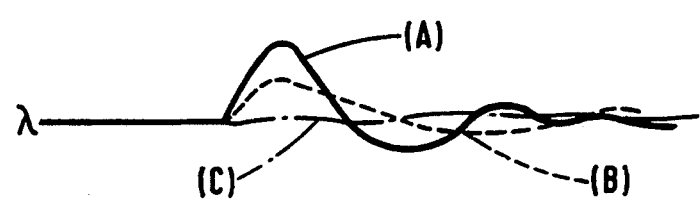
Fig.31

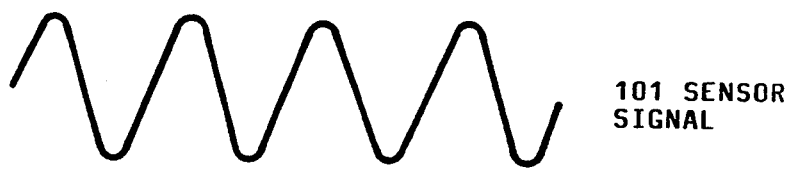
Fig.41(a) — 101 SENSOR SIGNAL
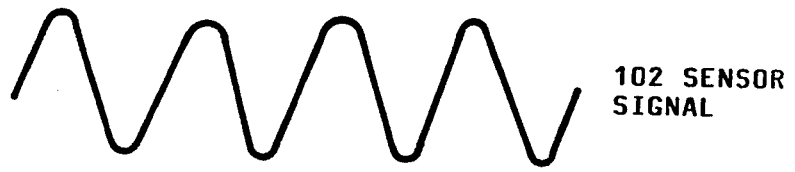
Fig.41(b) — 102 SENSOR SIGNAL
Fig.41(c) — PHASE DIFFERENCE
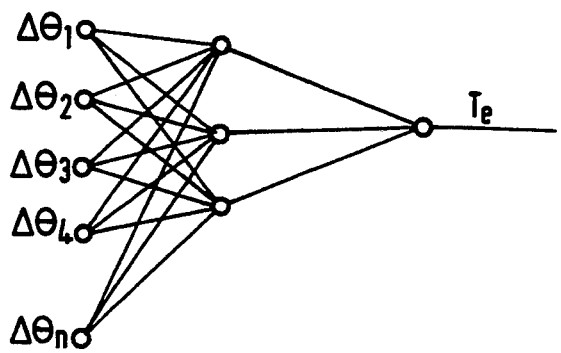
Fig.42(a)
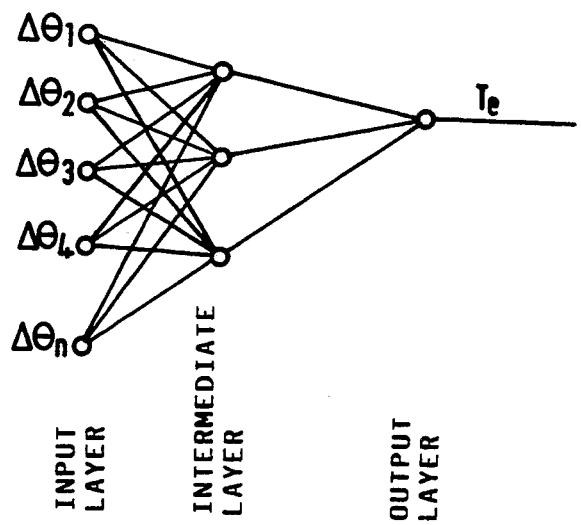
Fig.42(b)

CONTROL DEVICE FOR AN AUTOMOBILE

This is a continuation of copending application Ser. No. 07/649,014 filed on Jan. 31, 1991 now abandoned.

BACKGROUND OF THE INVENTION a) Field of the Invention

This invention relates to a control device for an automobile and particularly to a control device for an automobile applying neural network theory.

b) Description of the Prior Art

A pre-programmed control device currently in use with a digital computer is typically used for fuel control in an automobile. Examples are disclosed in, inter alia, U.S. Pat. Nos. 4,542,730 and 4,785,783 and in these prior art devices, a number of sensors have been used for detecting operational states of the engine, transmission, brake, vehicle height, suspension and the like. In addition, the outputs from each of these sensors are each used for a particular control variable or as a correction variable for a learning control.

In the prior art devices, however, the disadvantage exists that when using signals undergoing a complicated variation or including a great deal of noise, signal extraction precision is poor. In this respect, an engine knocking signal caused by bad timing or poor fuel consists of the signal caused by knocking and random noise caused by engine vibration and electrical noise. As a result it is extremely difficult to separate the signal due to engine knocking from the noise signal.

Also, there have been very complicated and hard-to-evaluate problems in connection with so-called sensitivity of passenger comfort, or personal preference between control variables of the automobile.

An object of this invention is to provide a control device for an automobile which at least partially mitigates the above disadvantages and problems.

An object of a feature of this invention is to provide an output signal from a sensor transformed into a plurality of signals, which are then inputted to an input layer of hierarchical neural elements, and the inputted signals therein are weighted according to weighting factors so as to generate a signal which is to be used as a parameter to determine control variables for control actuators in the automobile.

An object of another feature of this invention is that each control actuator of the automobile is controlled based on the results of the final outputs from hierarchical neural elements, an input layer of which was inputted with the output signals from a plurality of sensors.

SUMMARY OF THE INVENTION

According to this invention there is provided a control device for an automobile having at least one sensor adapted to detect an operational state of said automobile, and an actuator for controlling said operational state, said control device including a hierarchical group of neural elements adapted to receive an output signal from said at least one sensor, modifying means for adaptively controlling the neural elements in accordance with a desired parameter and a control means for receiving an output signal from said group of neural elements for controlling said actuator.

BRIEF DESCRIPTION OF THE DRAWINGS

FIGS. 12 to 14 show different engineering arrangements for the neural element shown in FIG. 6, FIGS. 15 and 16 show configurations of neural elements, FIGS. 17 to 19 show in schematic form various ways in which weighting factors for a neural element may be varied.

FIG. 31 shows in graphical form the variation of air-fuel ratio in relation to throttle value opening and the effect of learning.

FIG. 42(a) and 42(b) show neural elements used for detecting torque.

DESCRIPTION OF THE PREFERRED EMBODIMENTS

Figure 1:
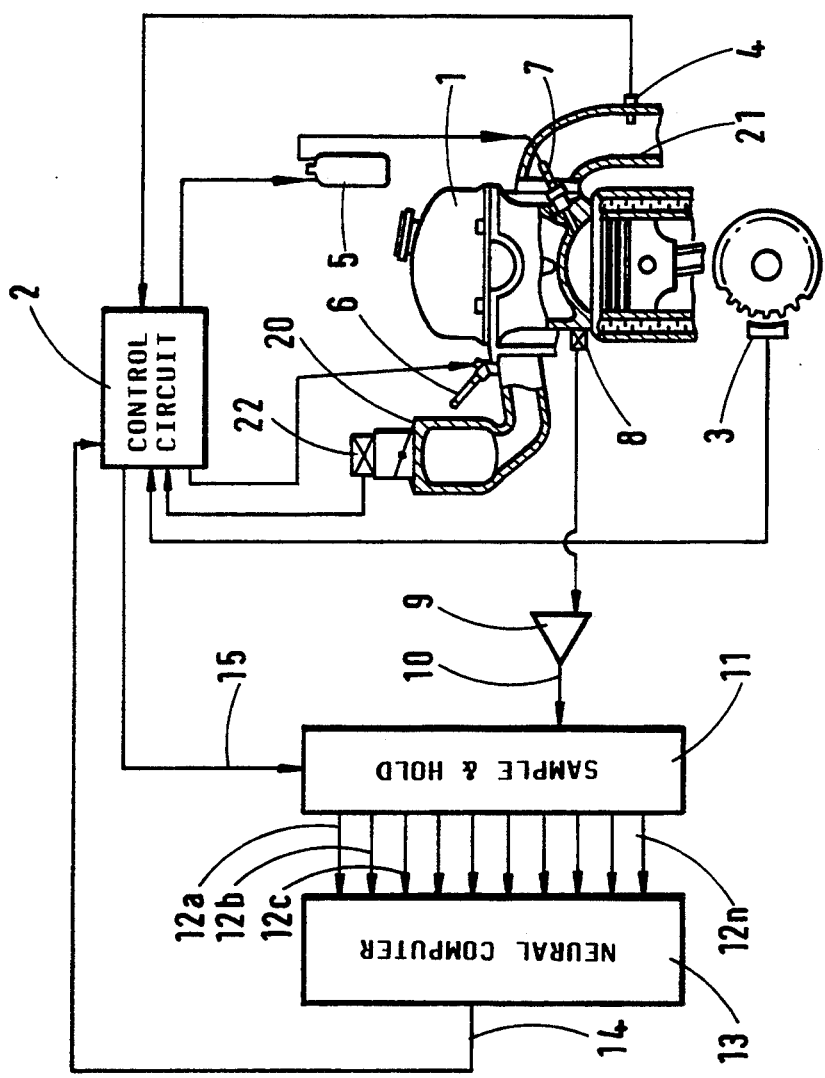
FIG. 1 shows in block schematic form a control device in accordance with one embodiment of this invention.

The control device shown in FIG. 1 is used with an automobile internal combustion engine 1 having an inlet air suction pipe 20 and an exhaust pipe 21. A fuel injection valve 6 is provided on a portion of the suction pipe 20 to supply fuel to the engine. Intake air flow is measured with an air flow sensor 22, and its measurement is inputted to a control circuit 2. The control circuit 2 also receives signals from a crankshaft rotation angle detector 3, an oxygen sensor 4 (and outputs from sensors of other engine parameters desired to be monitored), then supplies output signals, for example, to an ignition plug 7 via an ignition coil 5.

On the engine block is installed a knock sensor 8 for detecting mechanical vibration of the engine caused by poor detonation due, for example, to poor fuel or incorrect ignition timing. The signal from the knock sensor 8 is inputted to a sample and hold circuit 11 over line 10 via a high pass filter and amplifier 9, the input signal being given in time series to the sample and hold circuit 11. The sample and hold circuit 11 samples the time series signals on line 10 at a given time interval and holds the signals to provide a spatial multi-variable signal consisting of 12a, 12b, 12c, ..., 12n bits in sequence of input order, so as to be inputted to the input layer of a neural computer 13. The output voltage on line 14 from the neural computer is output in proportion to the intensity of engine knocking, and is converted from analog to digital signals in an A/D converter of the control circuit 2, then is used to control ignition timing. On the other hand, the signal on line 15 from the control circuit 2 is used for controlling the sample and hold circuit 11.

Figure 2:
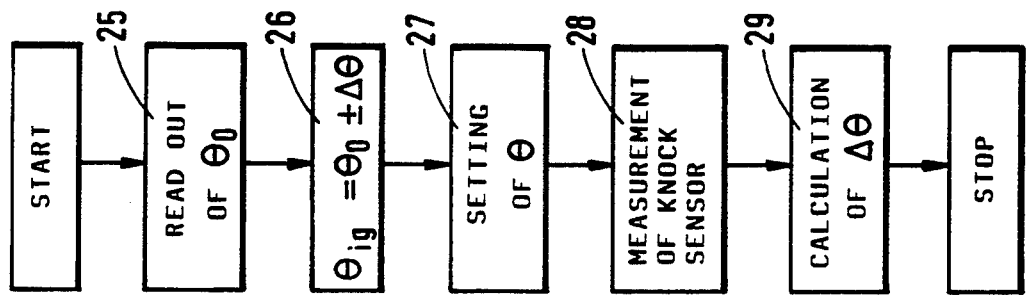
FIG. 2 shows a control flow sequence for ignition timing of the embodiment shown in FIG. 1.

In FIG. 2, a control flow sequence of ignition timing $\theta_{ig}$ is shown. When the control flow is started, a primary or basic ignition timing $\theta_o$ is fetched from a memory map in control circuit 2 and is read in Step 25. $\theta_o$ is determined by the number of engine revolutions and the load (or fuel injection period, throttle valve opening angle or the like). In Step 26, an ignition timing $\theta$ is calculated as $\theta_{ig}=\theta_o\pm\Delta\theta$, where $\Delta\theta$ is a calculated value for correction. In step 27, $\theta_{ig}$ is set to start ignition. In step 28, the intensity of knocking is measured from the output on line 14 from the neural computer 13. In Step 29, correction quantity $\Delta\theta$ is calculated, wherein $\Delta\theta$ is calculated in accordance with the magnitude of the output on line 14, from $-\Delta\theta$ (delay angle) to $+\Delta\theta$ (advance angle).

Generally, the cylinder of an engine has a natural frequency due to engine knocking as taught by Draper as follows.

$$F = \frac{C}{\pi B} U_{nm} \quad (1)$$

where,

B: cylinder bore diameter

C: sonic velocity $U_{nm}$: natural frequency of a vibrational mode

From the equation (1), knocking is determined by a relationship between B and C. Thereby, the knocking frequency varies according to the diameter of the cylinder bore.

Figure 3:
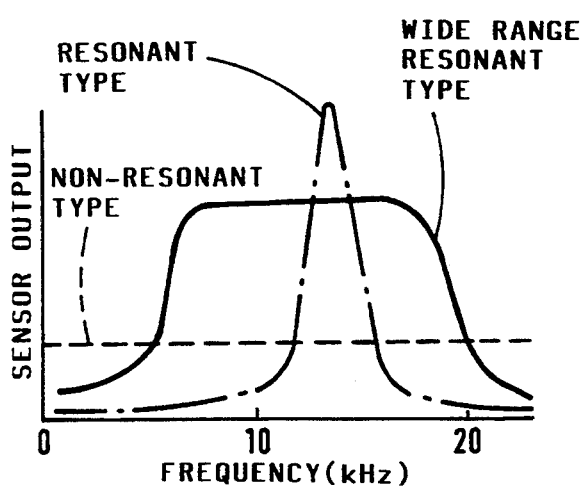
FIG. 3 shows in graphical form the relationship between sensor output for different types of knocking sensor against frequency.

FIG. 3 shows the relationship between frequencies and outputs for a different type of knock sensor 8. For a non-resonant type knock sensor, the output thereof is kept constant throughout the whole frequency range, though the magnitude of its output is very small. On the other hand, for a resonant type knock sensor, the output thereof becomes very large at a specific frequency. Further, for a wide-range resonant type knock sensor, though an amplitude of its output is smaller than that of the resonant type knock sensor, its resonance range extends to a wider range of the frequency.

Figure 4:
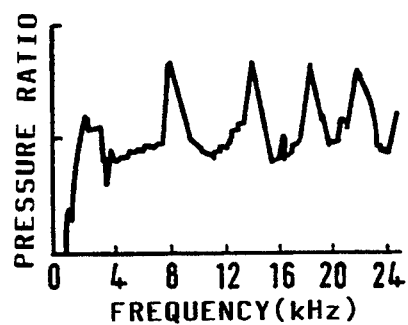
FIG. 4 shows in graphical form ratios of cylinder pressure against frequency.

FIG. 4 shows ratios of cylinder pressures at knocking to those without knocking relative to the frequency. It is shown in FIG. 4 that the pressure ratios become large at 7.9 KHz, 13.8 KHz, 18.5 KHz, and 22 KHz, thus exemplifying large pressure increases during knocking which is widely dispersed in frequency. Thus, a wide range resonant type knock sensor capable of detecting many knocking frequencies is preferred. However, the resonant type knock sensor may alternatively be used by setting its resonance point in accordance with the cylinder bore diameter.

Figure 5A:
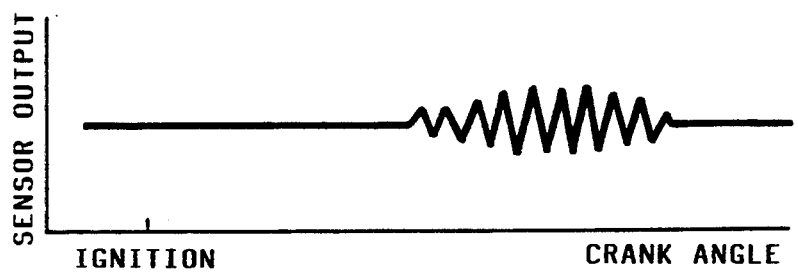
FIGS. 5(a) and 5(b) show in graphical form sensor outputs against frequency for different types of knock sensor.
Figure 5B:
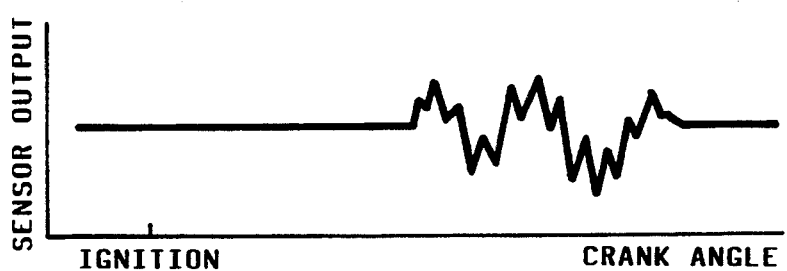

FIGS. 5(a) and (b) show the relationship between engine crank angle and knock sensor output. FIG. 5(a) shows the case of a resonant type knock sensor. Knocking phenomena are caused by reciprocating pressure waves travelling inside the cylinder, which are generated by self-detonation of mixtures due to an increase in cylinder pressure during combustion of mixtures in the cylinder. Therefore, knocking occurs delayed in time after the ignition. In the case of the resonant type sensor, its output is generated in the range of resonant frequencies. On the other hand, FIG. 5(b) shows the case of a wide range resonance type knock sensor. As shown in the FIG. 5(b), the sensor output is output as a synthesized wave of many frequencies. In both cases, knocking is initiated, with ignition as the starting point, but delayed in time from ignition. Thus, when controlling the sample and hold circuit 11 with the signal on line 15 from the control circuit 2, a sampling start signal may be generated with the instant of ignition as its starting point.

The sampling period of the sample and hold circuit 11 is advantageously set at about one tenth of the maximum measurement frequency for a wide range resonant type knock sensor. In other words, it is required to measure knock signals at predetermined intervals (preferably one tenth maximum measurement frequency) and again measure the knock signals at a next cylinder firing stroke of the cylinder of concern, the signals passing through the neural computer and then being compared to remove the effect of the noise component. The sampling period may be satisfactory if the minimum measurement frequency is less than the period of a minimum cycle, the sampling periods being less than the minimum measurement frequency.

For a resonant type knock sensor, sampling is preferably taken for more than one cycle at one tenth of the resonance frequency, as stated above.

Figure 6:
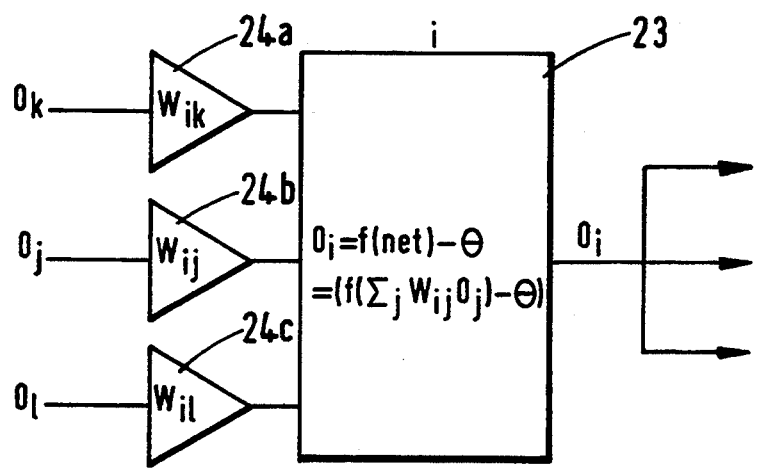
FIG. 6 shows in block schematic form a single neural element having the inputs thereof varied by different weighting factors.

A neural element 23, a constituent of a neural computer 13 is shown in FIG. 6 having inputs $O_k$, $O_j$ and $O_l$ multiplied in the neural element with weighting factor, $W_{ik}$, $W_{ij}$, $W_{il}$ respectively, and the output $O_i$ is expressed as follows.

$$O_i = f\left( \sum_j W_{ij} O_j \right) - \theta \quad (2)$$

where, $\theta$ is a threshold.

The output $O_i$ is then inputted to the next neural element.

Figure 7:
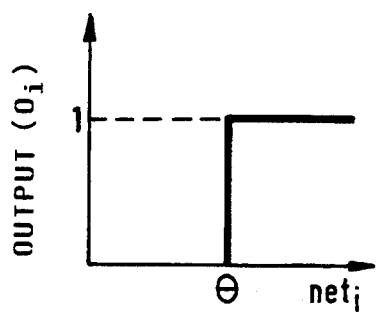
FIG. 7 shows the output of the neural element shown in FIG. 6 varied in a stepwise fashion.
Figure 8:
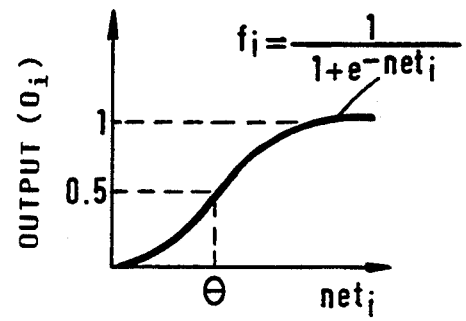
FIG. 8 shows the output of the neural element shown in FIG. 7 varied in accordance with a Sigmoid function.

However, there are two types of output $O_i$, one which changes stepwise as shown in FIG. 7 becoming 1 when exceeding the threshold $\theta$; the other, as shown in FIG. 8, represented by a Sigmoid function as follows.

$$f_i = \frac{1}{1 + e^{-net_i}} \quad (3)$$

In the present invention, where the output is desired to become proportional to the knocking intensity, a Sigmoid function representation is advantageous.

Figure 9:
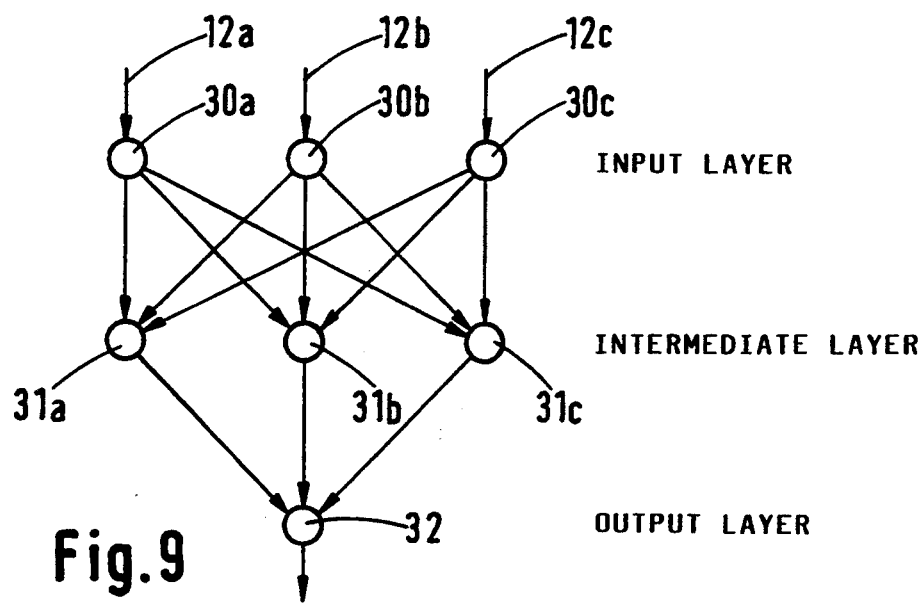
FIG. 9 shows in schematic form the configuration of neural elements in a hierarchical group of neural elements used in this invention.

In FIG. 9, part of the configuration of the neural elements in a neuralcomputer is shown. The neural computer has neural elements arranged in an input layer, an intermediate layer and an output layer. In the input layer, there are provided neural elements 30a, 30b and 30c, receiving input signals on lines 12a, 12b and 12c respectively from the sample hold circuit 11 in sequence. The output from the neural element 30a is inputted to neural elements 31a, 31b and 31c in the intermediate layer, after being multiplied with respective weighting factors. Similarly, the output signal from the neural elements 30b and 30c are inputted to the neural elements 31a, 31b and 31c in the intermediate layer, after being multiplied with respective weighting factors. The neural elements 31a, 31b and 31c have a threshold value $\theta$, which is subtracted from the respective outputs of the neural elements 31a, 31b, 31c, the various results are multiplied by various weighting factors and then inputted to a neural element 32 in the output layer, output from neural element 32 having a threshold value $\theta_2$ which is subtracted from the output signal of neural element 32.

Figure 10:
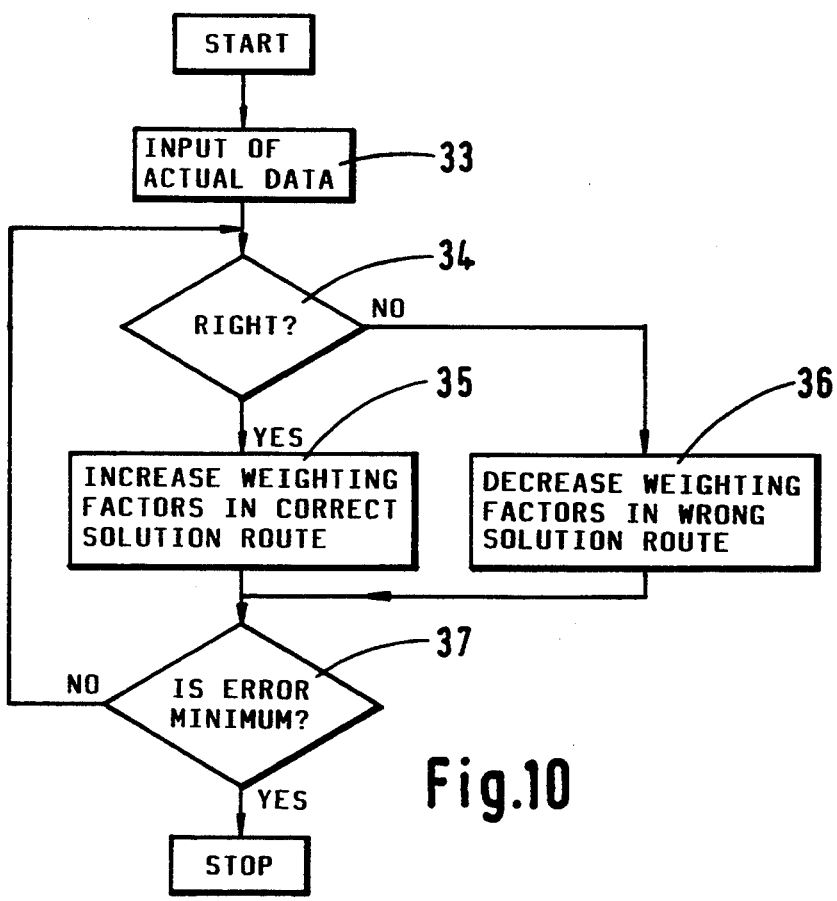
FIG. 10 shows a flow diagram of the learning process for weighting factors and thresholds in a neural computer used in this invention.

A flow diagram explaining the learning process for respective weighting factors and thresholds in the neural computer 13 is shown in FIG. 10. In Step 33, actual knock signal data is inputted to the input layer. Then it is judged in Step 34, whether data outputted to the output layer is correct. If yes, advance is made to Step 35, wherein the weighting factor of a correct solution route is increased. Similarly, in such a situation the thresholds $\theta_1$ and $\theta_2$ may alternatively be decreased. A difference from the correct solution is judged in Step 37, and when the error is below a predetermined amount, the flow sequence is completed. If the error is above the predetermined level, the sequence returns to Step 34, where weighting factors and thresholds are repeatedly readjusted until the error determined in Step 37 is acceptable. Through learning as described above over a number of cycles, a high percentage of correct solutions can be attained.

Figure 11:
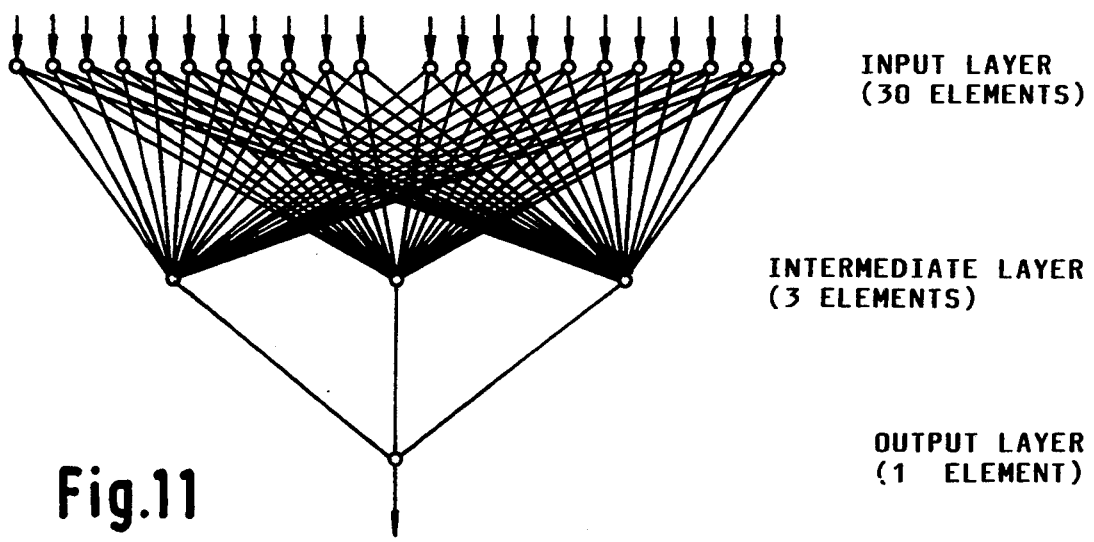
FIG. 11 shows a configuration of a neural computer using wide range resonance type knock sensors.

An exemplary configuration of a neural computer using a wide range resonance type knock sensor 8 is shown in FIG. 11. If the sensor 8 output is supposed to resonate at knocking frequencies 7.9 KHz, 13.8 KHz and 18.5 KHz, its sampling cycle which is a function of the highest knocking frequency is represented as follows, $$\frac{1}{18500 \times 10} = 5.4 \ \mu s \quad (4)$$

where 10 is the number of required sampling points, and its sampling period is therefore $$1/7900 = 126.6 \ \mu s \quad (5)$$

Therefore, the minimum number of input elements=

$$126.6/5.4, \text{ say } 30 \quad (6)$$

Thus:

The input layer: 30 elements
The intermediate layer: 3 elements
The output layer: 1 element
    Total: 34 elements From the above, in general the number of input elements is one cycle of sensor output waveform maximum frequency divided by the sampling period. Preferably, there are at least ten sampling points in each cycle. The configuration of these elements is shown in FIG. 11. The input layer is composed of 30 neural elements, respective outputs thereof being inputted to the three neural elements in the intermediate layer. The outputs from the intermediate layer are inputted to one output layer neural element.

The configuration in FIG. 11 is one of the embodiments of the present invention, wherein detection precision may be further improved by increasing the number of neural elements in the input layer and the intermediate layer.

FIGS. 12 to 14 show engineering arrangements of the neural element 23 shown in FIG. 6. FIG. 12 shows an operational amplifier having amplification factor A, while FIGS. 13 and 14 show a transconductance amplifier having a gain 6, and an inverter, respectively. In each case, the following explanation applies.

$v_i^+$, $v_i^-$: input voltages
$v_o^+$, $v_o^-$: output voltages

FIGS. 15 and 16 show configurations of the coupling transistors in the input stages shown in FIGS. 12 and 13. FIG. 15 is an example showing bipolar transistors, and FIG. 16 is an example showing CMOS transistors. In the FIGS. 15, 16 KB, DB,KM and DM are respective constants, $I_{EE}$ and $I_{SS}$ are output values.

Figure 18:
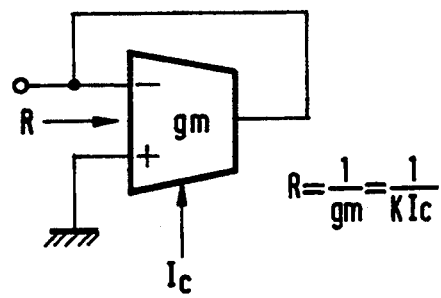
Figure 19:
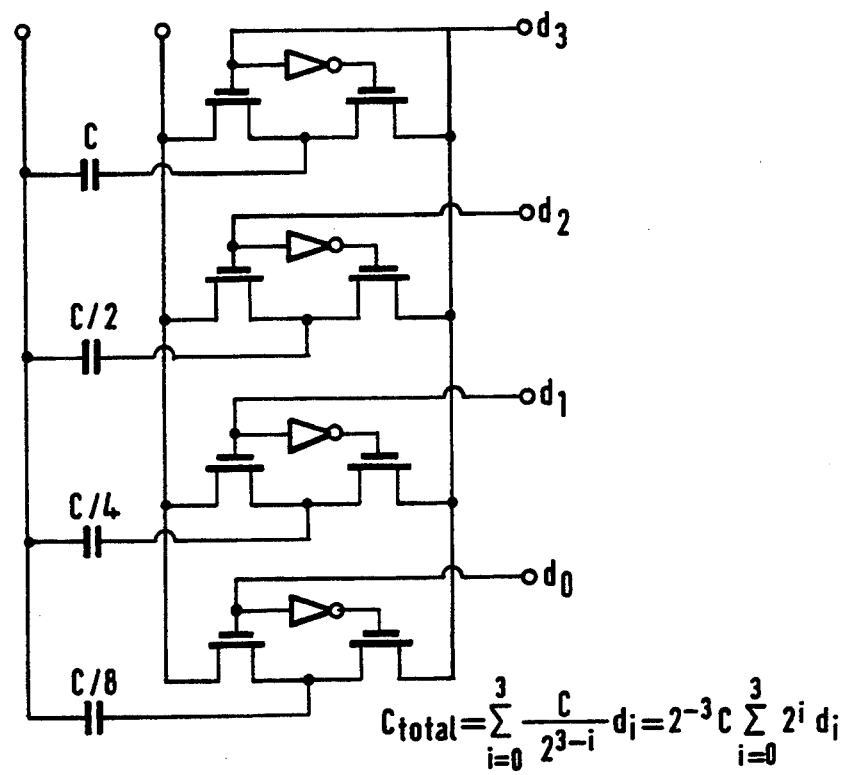

In FIGS. 17 to 19, there are shown block diagrams for engineeringly obtaining weighting factors for the neural element 23. In FIG. 17, the triode region of an FET was used where K is a constant and R is input resistance. In FIG. 18, a transconductance amplifier was used where R is input resistance and $g_m$ is gain, while in FIG. 19 an array of 4 bit capacitors was used where c denotes capacitance and d denotes digital input.

Figure 20:
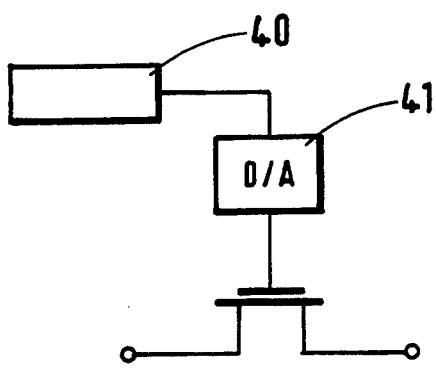
FIG. 20 shows in block schematic form an arrangement for storing weighting factors obtained by learning.

FIG. 20 shows in block schematic form an arrangement for storing weighting factors obtained by learning. The weighting factors which are stored in a memory 40 of the computer in the control circuit 2 are converted to analog signals in a D/A converter 41 for driving an FET.

Figure 21:
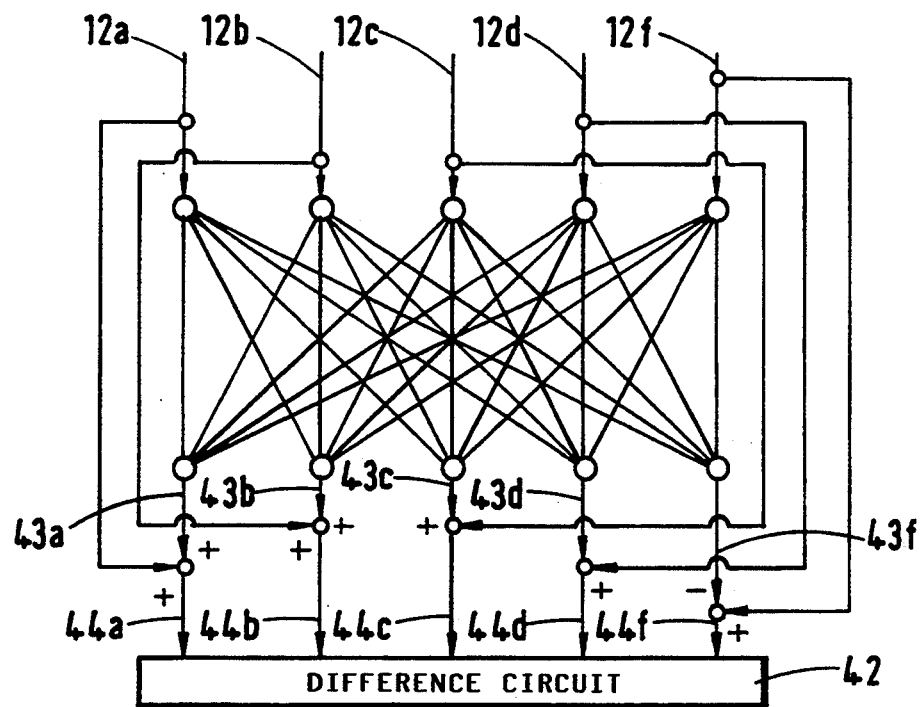
FIG. 21 shows another embodiment of a control device in accordance with this invention using a resonant type knock sensor, FIGS. 22(a)-(c) respectively show signals at various points in the FIG. 21.

FIG. 21 shows another exemplary embodiment using a resonant type knock sensor 8. Time series signals from the knock sensor 8 are transformed into spatial multivariable signals in the sample and hold circuit 11, the output signals from which are designated as being on lines 12a–12f. These signal lines 12a–12f are inputted to a neural computer having an input layer and an output layer having output lines 43a–43f, wherein the numbers of neural elements in the input layer and the output layer are set to be equal. Further, a sampling cycle is set to be ¼ of the resonant frequency, and the sampling time is the same as the resonant frequency. The signal at line 43a is thus minus the components of the resonant frequency, and therefore consists mostly of noise components. Therefore, by deducting the original signals inputted to the input layer from the signals on lines 43a–43f respectively, in subtractors, there are obtained noise-free resonance frequency signals on lines 44a–44f. In a circuit 42, the difference between the maximum value and the minimum value in signals 44a–44f is calculated to be used as a knocking detection signal.

Figure 22A:
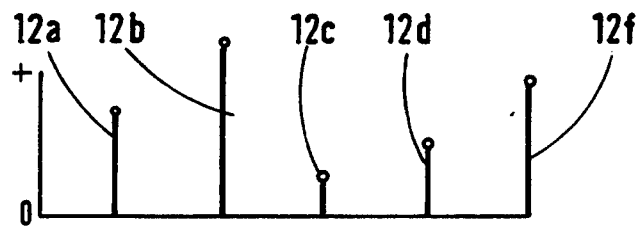
Figure 22B:
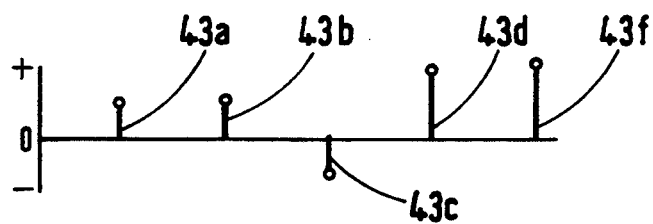
Figure 22C:
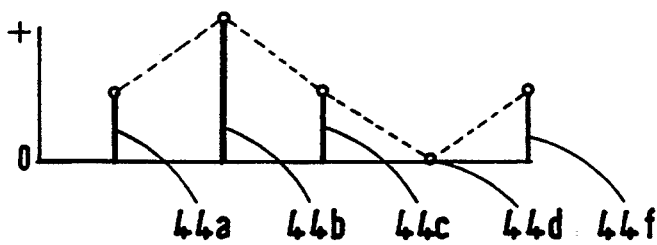

FIG. 22 shows respective signals in each portion at the various lines of FIG. 21. FIG. 22(a) shows input signals 12a–12f; FIG. 22b shows the noise signals 43c–43f; and FIG. 22(c) shows the resonant frequency signals 44a–44f. In the embodiment of FIG. 21, the sampling was taken at a ¼ cycle of the resonant frequency. However, by sampling at a smaller cycle, measurement precision can be improved.

Figure 23:
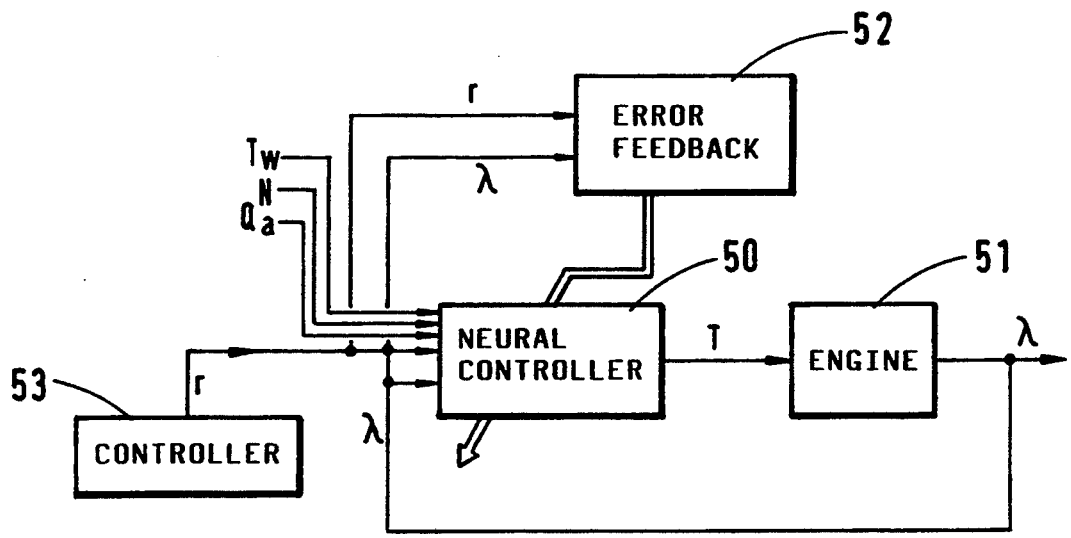
FIG. 23 shows in block schematic form a second embodiment of a control device using a neural network in accordance with this invention.

FIG. 23 is a schematic diagram of an engine control device using a neural network. Various object values are inputted to a neural controller 50, and the resultant output is applied to an engine 51, which is the object of control. The particular condition being controlled in the engine is then fed back to the neural controller 50. In addition, there are provided, routines by an error feedback device 52. The error feedback routines are for correcting a weighting factor W in the neural network of the neural controller 50, or a transformation function for neural elements. The error feedback routines detect differences between the objective values and the actual values representing engine state, especially when the differences are great in the manner described above in relation to FIGS. 9 and 10.

The arrangement shown in FIG. 23 is a system for controlling air-fuel ratio state (condition) in an engine. An objective value r for the air-fuel ratio of the engine is outputted by a controller 53 to the neural controller 50 and the error feedback device 52. In addition, various quantities of engine state such as cooling water temperature Tw, the number of engine revolutions N, engine input air flow (indicative of load) Qa and the like are also inputted to the neural controller 50. An open period of a fuel injection valve (time T) is outputted from the neural controller 50. Given the time T, the engine 51 outputs a resultant actual air-fuel ratio (A/F) λ. The A/F ratio λ is fed back to the neural controller 50 and to the error feedback device 52. The error feedback device 52 then determines the error difference between the objective value r, and the actual value λ. If there is a large difference of error, the configuration of the neural controller 50 is estimated to be inadequate, thus, demanding action to be taken for its reconfiguration. This reconfiguration can be executed through rewriting weighting factors in the neural network, or by transformation functions (Sigmoid Functions or the like), in the manner described hereinabove.

Figure 24:
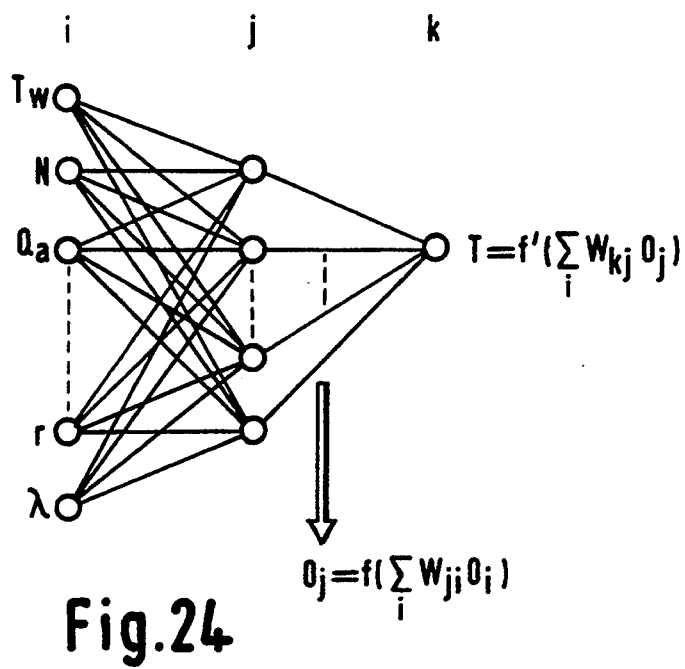
FIG. 24 shows a configuration of the neural elements in the network used in the embodiment of FIG. 23.

In FIG. 24 the configuration of such a neural network is shown, which consists of an input layer i, an intermediate layer j and an output layer k. The output $O_j$ from the intermediate layer is expressed as follows.

$$O_j = f\left( \sum_i W_{ji} O_i \right) \quad (7)$$

where, f is a transformation function, for instance, such as a Sigmoid function given hereinbefore. An output T is expressed as follows.

$$T = f\left( \sum_j W_{kj} O_j \right) \quad (8)$$

Figure 25A:
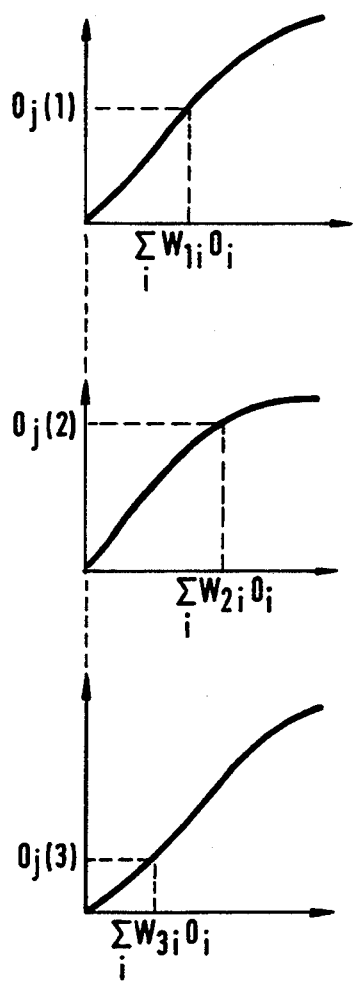
FIG. 25(a) shows graphical figures of mode or function transformation in an intermediate layer for different neural elements.

FIG. 25(a) shows the mode of function transformation in the intermediate layer j. $O_j(1)$ shows the state at the first neural element in the intermediate layer, the sum of the inputs to which neural element is $$\sum_i W_{1i} O_i$$

Figure 25B:
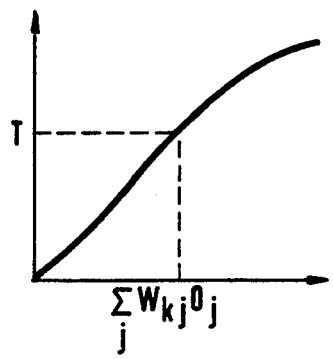
FIG. 25(b) shows the sum of the outputs of the neural elements in the intermediate layer which is applied to an output layer.

The output of this function is transformed into a nonlinear function to be $O_f(1)$. The following outputs in the intermediate layer are determined likewise to be $O_f(2)$, $O_f(3)$, ... Then, the sum of the outputs from the intermediate layer $$\sum_j W_{kj} O_j$$

becomes an input to the neural element in the output layer as shown in FIG. 25(b). Here, it is also transformed so as to yield an output T. The output T is then given to the engine 51.

In the present example, T is required to be determined as a time delay in transporting fuel during a transient state of the engine, and T may readily be given by choosing a desirable value in the functions in FIG. 25(a). The neural controller 50 may be considered to be a model simulating the internal state of the engine 51, wherein, very complicated phenomena such as the delay in transport of fuel and the like which are hard to describe mathematically can be corrected and compensated through repeated reconfiguration by a learning process, as will be described later herein.

Figure 26A:
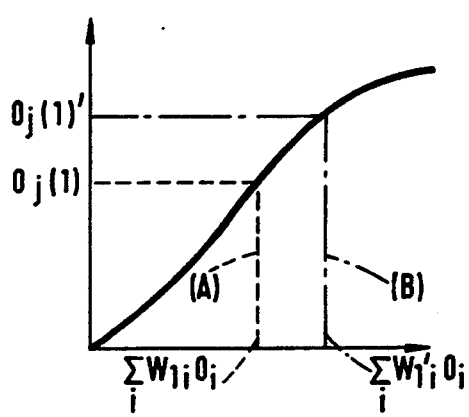
FIG. 26(a) shows a graph of the output of a neural layer indicating the effects of learning.

The mode of reconfiguration in a neural network is shown in FIG. 26(a), wherein an example is given which was obtained by rewriting a weighting factor for a neural element. The original state before learning is indicated by broken line (A) with its output being $O_f(1)$. When its weighting factor is rewritten to $W_{1i}$, through learning, it changes to a state as indicated by chain broken line (B) with its output being $O_f(1)'$. As explained above, an output different from the original can be obtained by rewriting the weighting factors.

Figure 26B:
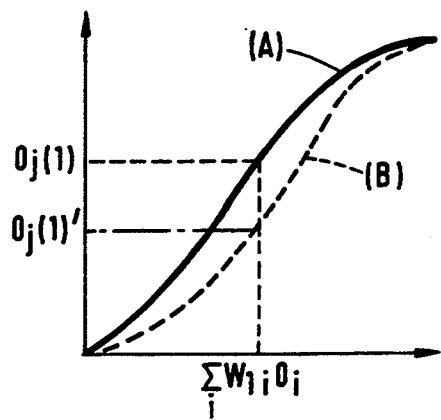
FIG. 26(b) is also a graphical figure showing the effects of learning.

FIG. 26(b) graphically shows another method for rewriting a transformation function so that a curve (A) shown in solid line in the FIG. 26(b) obtained before learning can be changed to a curve (B) (shown in broken line) after learning by changing the threshold value. By this means, for the same input of $$\sum_i W_{1i} O_i$$

the output is changed from $O_f(1)$ to $O_f(1)'$. That is, by changing the shape of the transformation (Sigmoid) function, learning can be performed.

Figure 27:
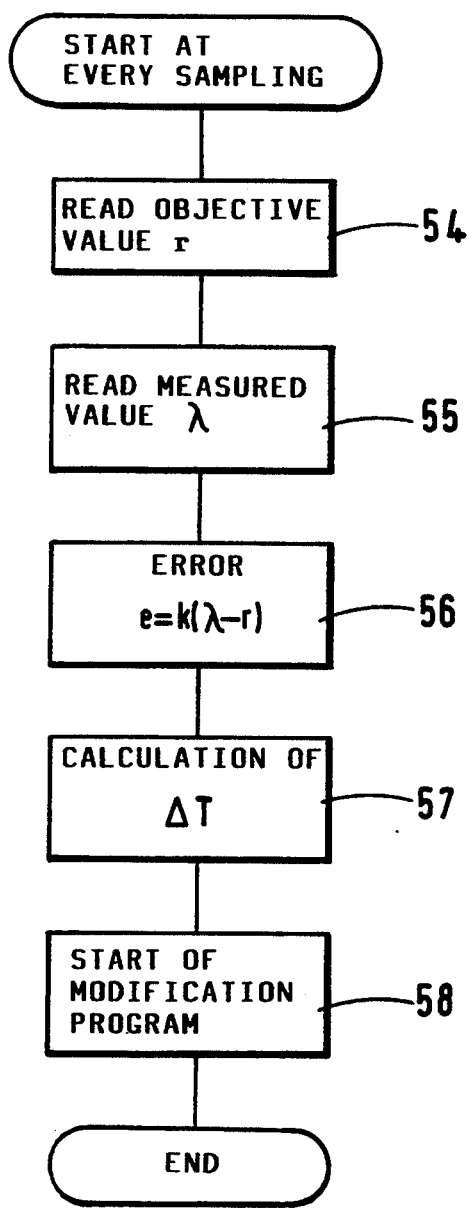
FIG. 27 is a flow diagram of learning in a neural controller.

A flowchart of learning in the neural controller 50 for the arrangement of FIG. 23 is shown in FIG. 27. A learning operation is activated at every sampling of λ. In Step 54, an objective value is read. In Step 55, the actual A/C ratio value λ is read. In the next Step 56, an error e is obtained. The error e, which is of course a variable, is expressed as follows.

$$e = k(\lambda - r) \quad (9)$$

Based on the value of e, a correction quantity of T, i.e., ΔT, is calculated in Step 57. Then, in Step 58, a modification program is started.

Figure 28:
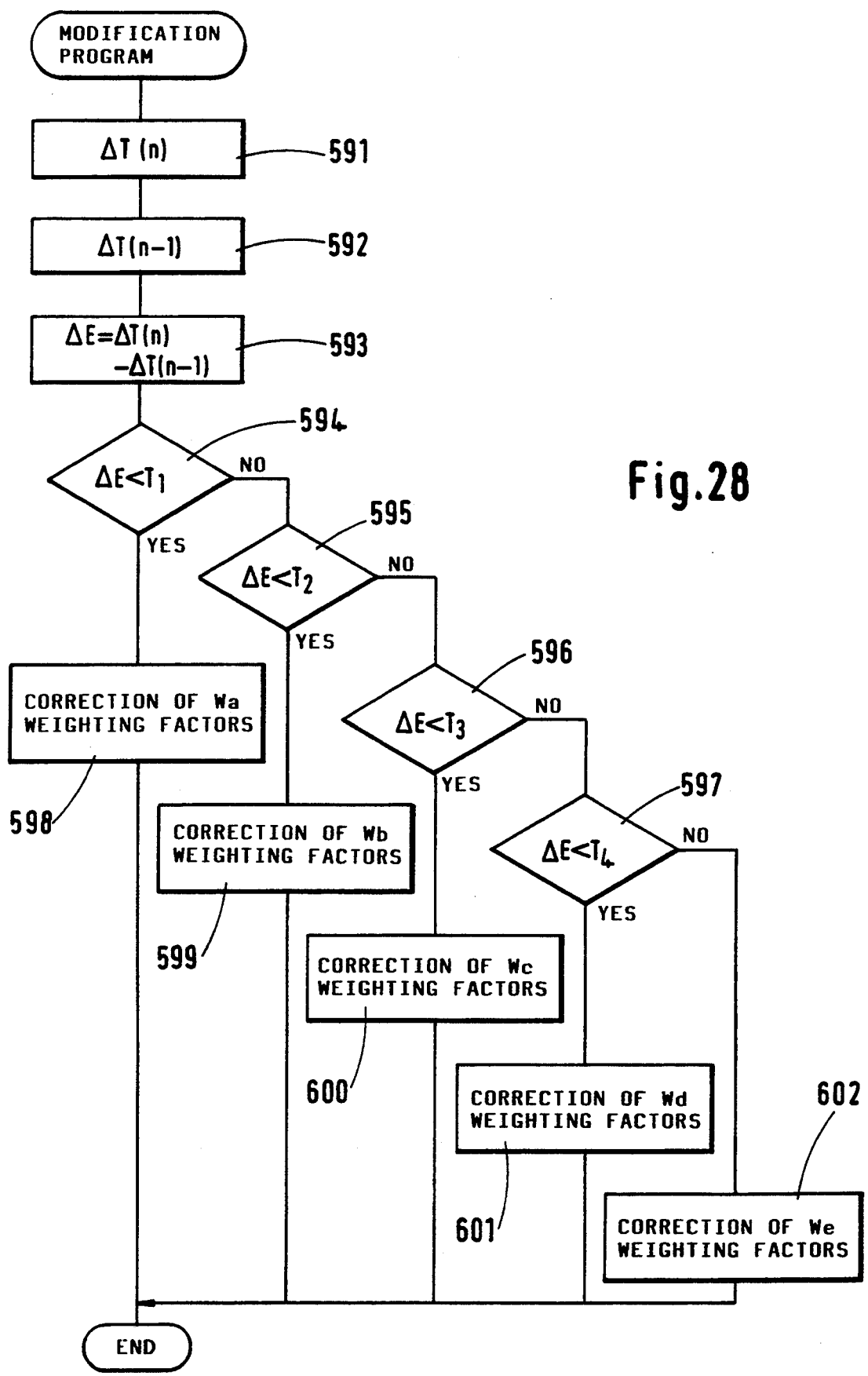
FIG. 28 is a modification of the flow diagram shown in FIG. 27.

In FIG. 28, a modification program is shown. When this program is started, ΔT(n) for the present sampling is read in Step 591, and the ΔT(n−1) for the preceding sampling is read in Step 592, then the difference ΔE between both the present sample and preceding samples is obtained in Step 593. The magnitudes of ΔE are evaluated in step 594~597 in comparison with reference values $T_1$ to $T_4$. In dependence upon their respective magnitudes, weighting factor W groups undergo fine adjustment in Steps 598~602.

Figure 29:
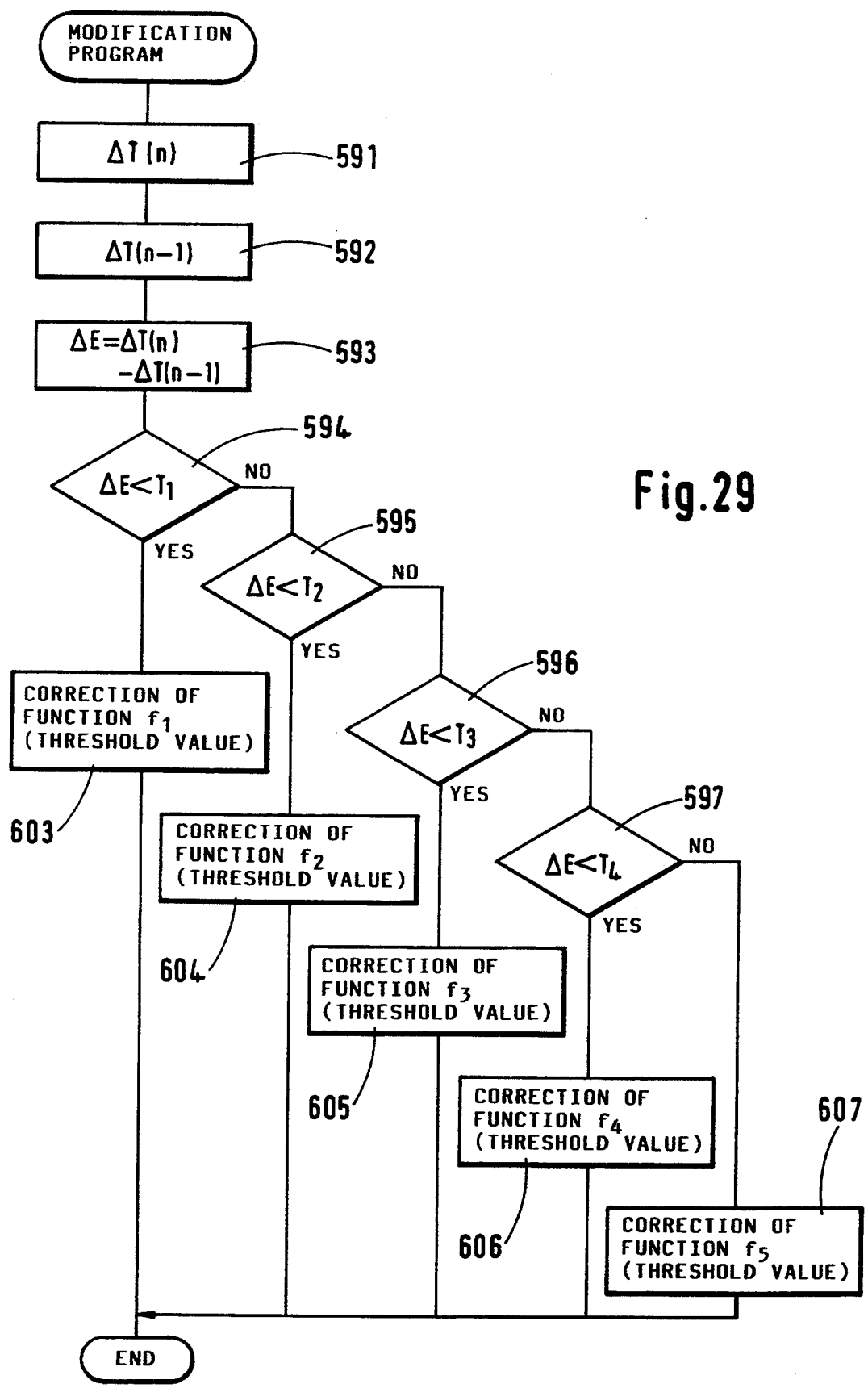
FIG. 29 shows an alternative modification of the flow diagram shown in FIG. 27, FIG. 30(a) and FIG. 30(b) show flow diagrams in which modification or correction variable quantities are stored.

FIG. 29 shows an alternative modification program. Herein, steps 591~597 are the same as in FIG. 28, but in steps 603~607 the functions $f_1$ to $f_5$ are modified or corrected in dependence upon the magnitude of ΔE.

Selections in the weighting groups Wa to We in FIG. 28, or the functions $f_1$ to $f_5$ in FIG. 29, are made from preset programs, writing of which has been theoretically determined.

In FIGS. 30(a), (b), a method for storing and reading modification or correction variable quantities is shown. As shown in FIG. 30(a), after a modification program is completed, modified quantities (weighting factors or functions) are promptly stored in a battery backed up memory in order to retain learning effects. These modification quantities thus stored are fetched and read instantly after an ignition key switch is turned on (FIG. 30(b)).

FIG. 31 shows an example of the effect of learning. Variations in λ, i.e., air-fuel ratio, are shown relative to the acceleration throttle opening angle θac. It is shown that the variation in λ becomes smaller through learning steps (shown in the lower figure) by lines from (A) to (C).

As shown above, because the learning in a neural network can be accomplished by rewriting weighting factors, a great learning effect can be achieved even if the design engineer responsible for devising the engine control circuits does not know the exact model of the internal combustion engine.

Figure 32:
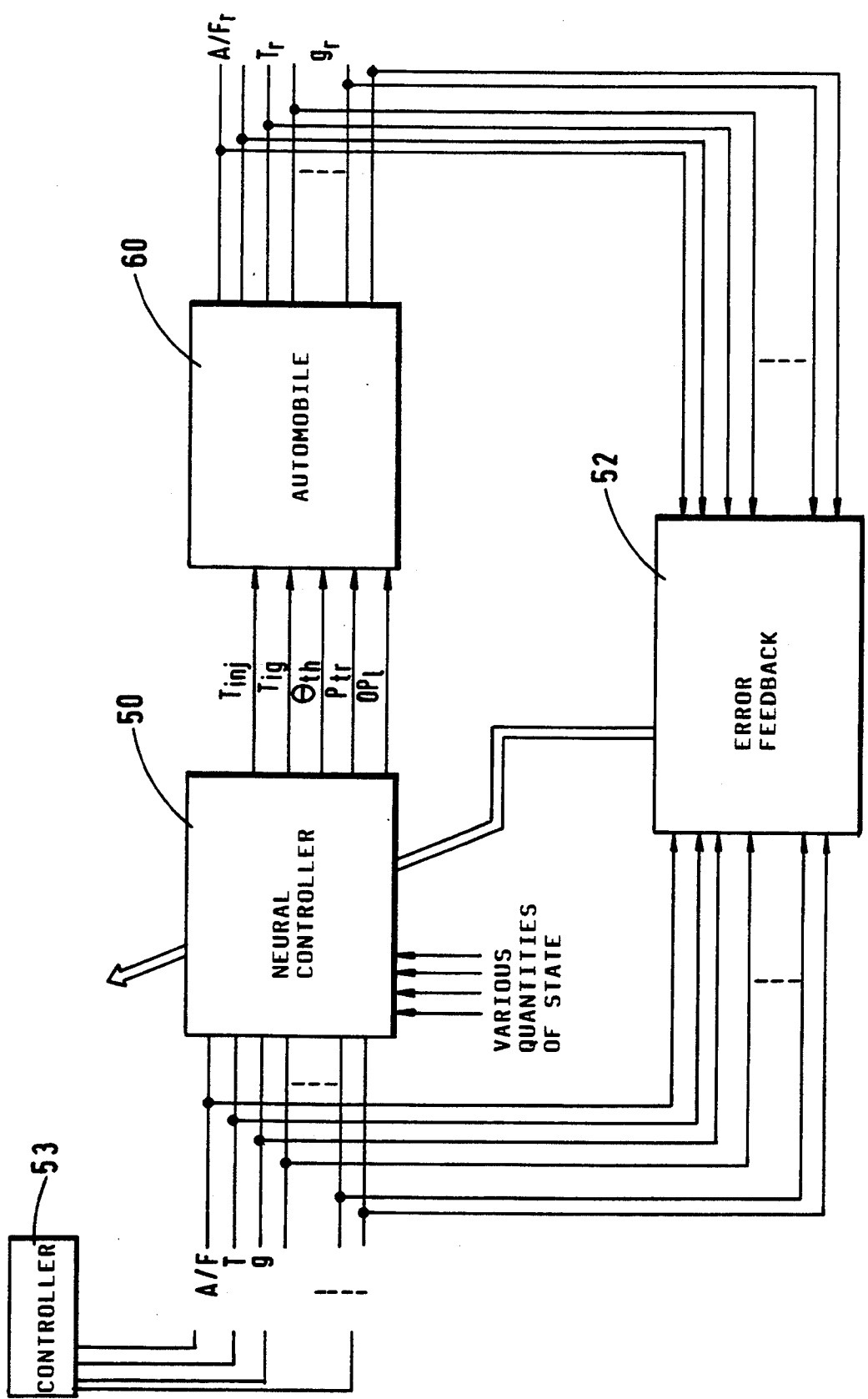
FIG. 32 shows in block schematic form a multi-variable control device in accordance with a feature of this invention.

FIG. 32 shows an example of a multi-variable control device using the present invention. In this embodiment, objective values of an air-fuel ratio A/F, a torque T and an acceleration g are given to a neural controller 50 from a controller 53. An injection valve opening time $T_{inj}$, an ignition timing $T_{ig}$, a throttle valve opening angle $θ_{th}$, a gear position in a transmission $P_{tr}$, and a line pressure $OP_l$ are output from the neural controller 50 to an automobile 60. Actual values of air/fuel ratio $(A/F_r)$, torque $(T_r)$ and acceleration $(g_r)$ of the automobile are measured and are outputted, to an error feedback device 52, which also receives the objective values A/F, T and g, wherein, based on the errors and the correction quantities calculated as explained above with reference to FIGS. 27 to 30, the error feedback device 52 provides reconstruction configuration data to the neural controller as required. The neural control can, thus, be applied to a multi-variable controller.

Figure 33:
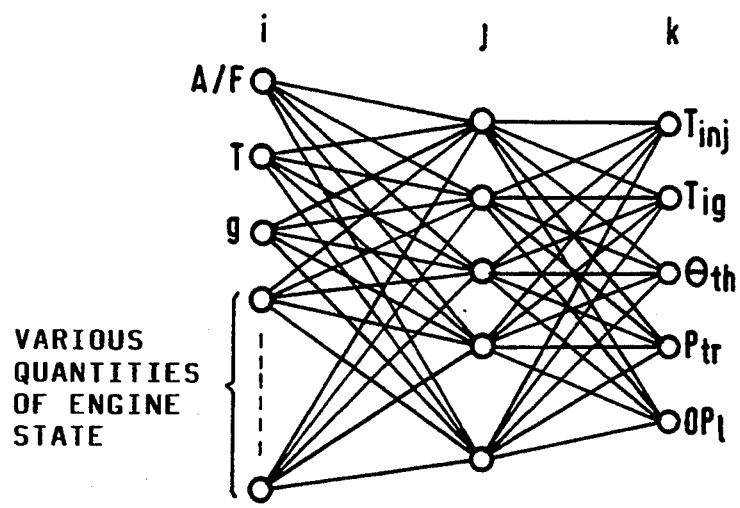
FIG. 33 shows a neural network for use in the arrangement of FIG. 32.

The construction of a neural network 50 is shown in FIG. 33. In addition to the objective values A/F, T, g, various quantities of engine state such as water temperature, intake air flow, engine revolutions, load and the like are inputted to the input layer for evaluation, transferred through intermediate layer j and output from layer k.

Figure 34:
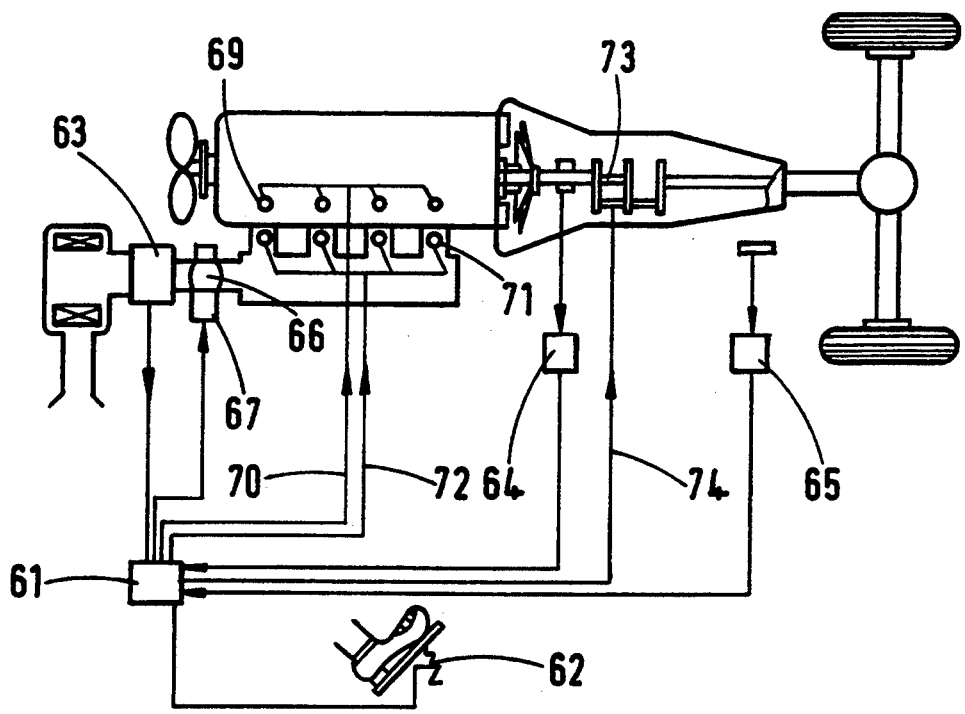
FIG. 34 shows an arrangement of sensors in an automobile for use with a control device in accordance with this invention.

FIG. 34 shows an arrangement of sensors on an automobile including a controller 61 which includes the neural controller 50.

The controller 61 receives inputs from a throttle opening angle (θac) sensor 62, an air flow sensor 63, a torque sensor 64, an acceleration sensor 65, and provides outputs to an actuator 67 which electrically activates a throttle value 66, an ignition signal on line 70 to an ignition coil 69, an open value signal on line 72 to an injection valve 71, a gear position signal on line 74 to a transmission 73, and a hydraulic line pressure control signal $OP_1$ (not shown in the Figure) for controlling the transmission. As indicated, the foregoing multi-variables are controlled by the neural controller 50.

Figure 35:
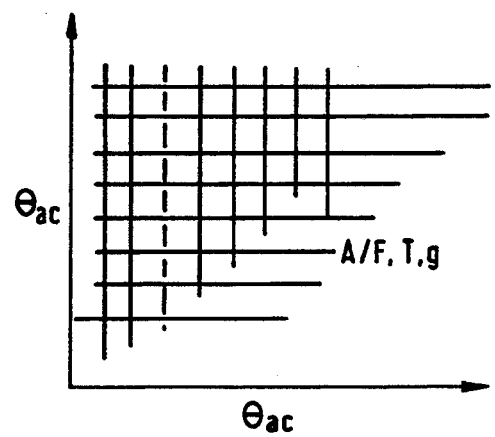
FIG. 35 shows in graphical form a map whereby air-fuel, torque and acceleration may be derived in accordance with throttle opening angle and speed of opening.

An example of a determining means for the objective values A/F, T, and g is given in FIG. 35, wherein an acceleration throttle opening angle $\theta ac$ reflecting a driver's intention for action is used as an input so that the torque T and acceleration g may be accordingly determined. Representing the change in $\theta ac$ with time is $\theta$ as is shown in FIG. 35, from $\theta ac$ and $\theta$ objective values may be retrieved from three different maps representative of A/F, T and g, respectively.

Figure 36:
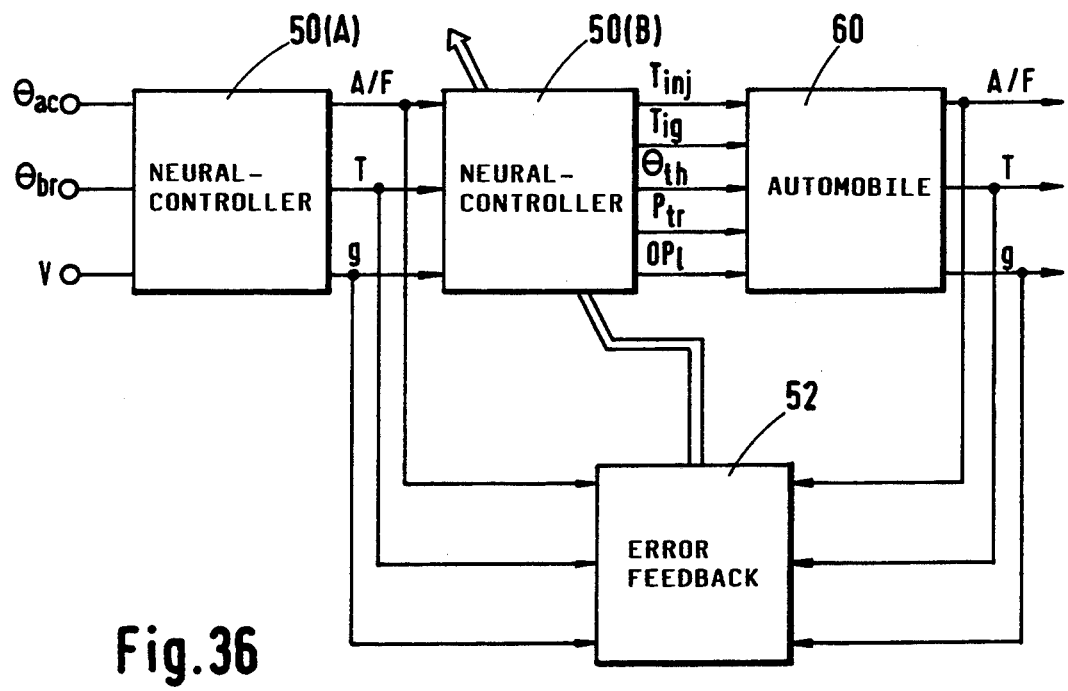
FIG. 36 shows another embodiment of a feature of this invention in which a pair of neural control devices are used.

Another example of determining objective values is shown in FIG. 36, wherein a pair of neural controllers 50(A) and 50(B) are employed. In the neural controller 50(A), inputs are received from an acceleration throttle opening angle $\theta ac$ sensor, a braking angle $\theta br$ sensor, and a travelling speed V sensor, such that a driving environment for the automobile is evaluated. That is, it is evaluated whether the automobile is passing through an urban district, a highway, a traffic jam, a rough road (gravel, wet, or frozen), climbing a hill, or going down a slope, so as to determine optimum objective values to be given as torque and acceleration corresponding to such environments. These objective values thus determined are given to the neural controller 50(B) so as to control the various components in the car as described above.

Thus, the example in FIG. 32 explains a case where an automobile is controlled more in accordance with a driver's intended action, while the example in FIG. 36 explains a case where the automobile is controlled to achieve an optimum driving performance matched to the environment.

Figure 37A:
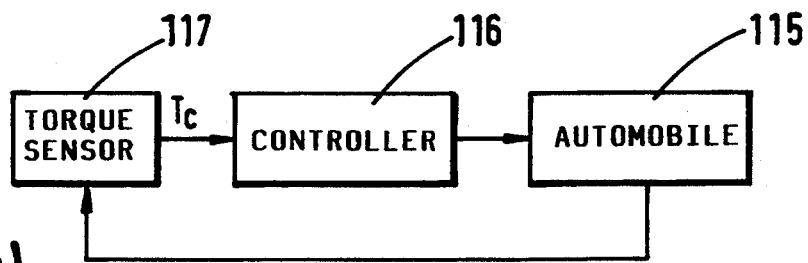
FIG. 37(a) shows in block schematic form a further embodiment of this invention used with a torque sensor.

In the arrangement of FIG. 37(a), there is an automobile 115, a vehicle control device 116, and an engine crankshaft or output torque sensor 117. The engine crankshaft or output torque is detected by the engine crankshaft or output torque sensor 117, and is evaluated in the vehicle control device 116 whether the torque is the same as the objective torque. If it is not the same as the objective torque, a parameter for varying the output torque of the engine 115 is changed and controlled so as to yield an output the same as the objective torque.

Figure 37B:
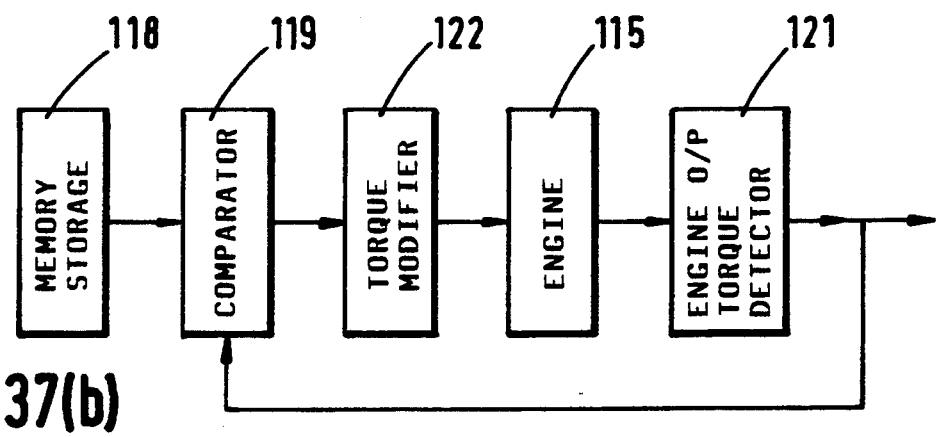
FIG. 37(b) shows a control flow block diagram for the arrangement of FIG. 37(a)
Figure 38:
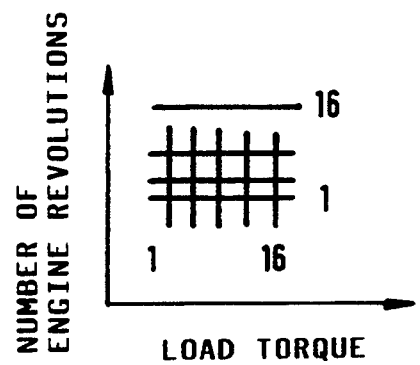
FIG. 38 shows a map of the engine revolutions and low torque of the arrangement shown in FIG. 37(a)

A control flow block diagram for the arrangement of FIG. 37(a) is shown in FIG. 37(b). An objective torque map is stored in a memory 118. The memory 118 is a RAM which is backed up, for example, by a ROM or a battery. The objective torque is, for example, a map of the engine revolutions and the load torque (shown in FIG. 38). Instead of the load torque, a basic fuel injection pulse width, an intake pressure, a throttle valve opening angle or acceleration valve opening angle may alternatively be used. The objective torque is compared in a comparison means 119 with the actual engine crankshaft torque of the engine. When the actual torque does not agree with the objective torque, a parameter for varying the output torque is modified in a torque modification means 122 so as to change the output torque from the engine 115. As a means for modifying the torque, the throttle valve opening angle, amount of fuel, or ignition timing may be modified. The output torque of the engine is detected by a torque detection means 121.

Figure 39:
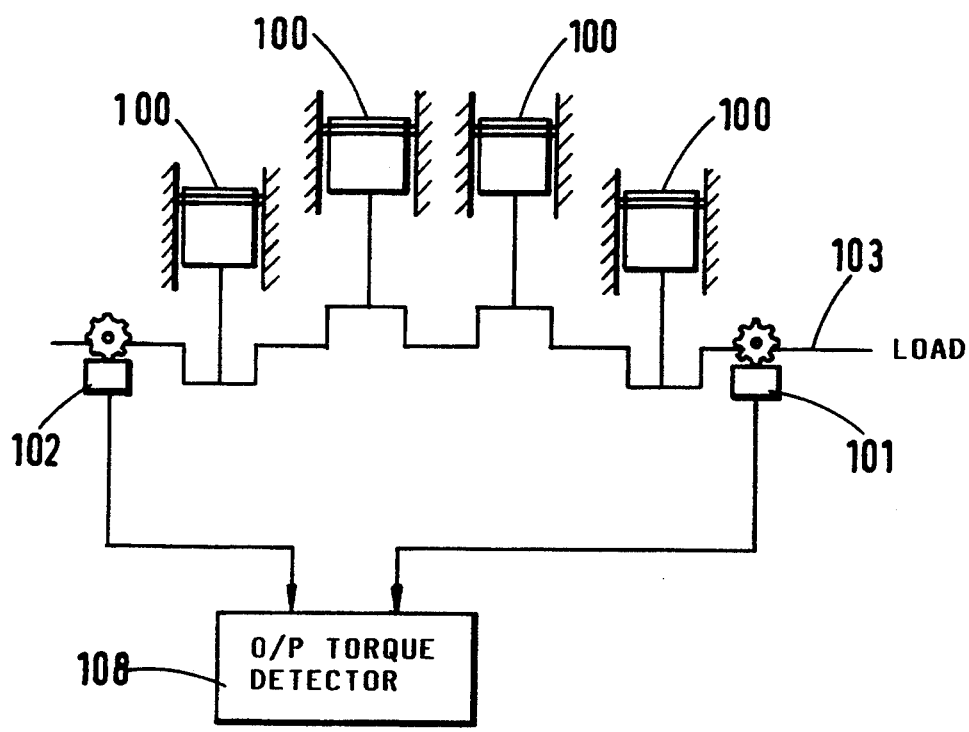
FIG. 39 shows in block schematic form an arrangement for detecting engine output torque.

FIG. 39 shows an engine shaft torque detection means. An engine crankshaft 103 interconnects, for example, four pistons 100, the number of pistons not being limited thereto in this invention. On opposing ends of the crankshaft are installed a sensor 101 and a sensor 102 to detect rotation angles at the respective ends of the crankshaft. Signals from the sensors 101 and 102 are processed in an output torque detection means 108. As is well known, engine crankshaft torque output or horsepower can be detected by detecting the torsional angle of the crankshaft.

Figure 40:
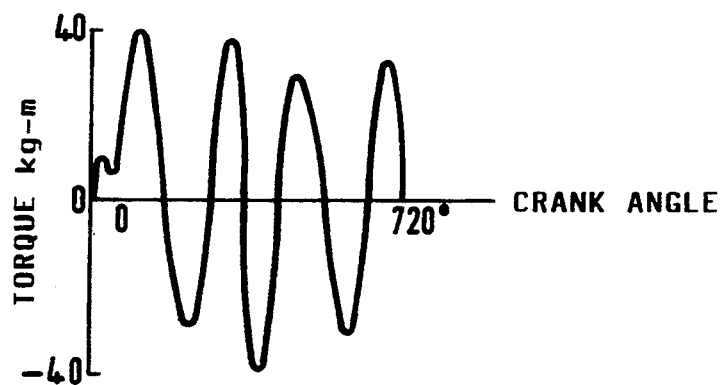
FIG. 40 shows in graphical form the results of measurement of the arrangement shown in FIG. 39, FIG. 41(a), (b), (c), show in graphical form outputs from various sensors.

In FIG. 40, an example of the results of the measurements of the output torque for a single cylinder internal combustion engine are shown. The output torque is shown to undergo a complicated variation with change of the crank angle because of a synthesized effect of combustion pressure and cylinder inertial force. Further, in a multi-cylinder internal combustion engine, the detection of the engine output torque is more difficult because of the inclusion of synthesized output torque between each cylinder.

FIG. 41(a) to (c) shows examples of sensor outputs. Sensor 101 and sensor 102 are, for example, a gear wheel and an electromagnetic pick-up. When the crankshaft is rotated, signals such as shown in FIG. 41(a) and (b) are output from the sensors 101 and 102 respectively. A phase difference between the two signals of sensors 101, 102 is obtained as a signal shown in FIG. 41(c). The phase difference corresponds to the torsional angle of the crankshaft. In other words, the torsional angle of the crankshaft can be defined by the phase difference in respective signals from two sensors as follows.

$$Te = f(\theta cr) \quad (10)$$

where Te is crankshaft torque and $\Delta\theta cr$ is the torsional angle of the crankshaft.

By means of the torsional angle $\Delta\theta cr$ in Equation (10), an output torque can be obtained. However, as described above, because the output torque tends to be influenced by combustion pressure and inertial forces, including the number of cylinders, the function $f(\Delta\theta cr)$ has previously been very difficult to obtain. It is especially difficult to obtain an output torque during high speed rotation of the engine because of the shorter time for processing and the increased value in torsional angles. Because of this, an approximated model for the function $f(\Delta\theta cr)$ has sometimes been used, but its precision has not been satisfactory. Further, when the precision of the model is desired to be improved, a lot of time is needed for computing, thereby restricting practical application of the computation.

In FIGS. 42(a) and (b), a torque detection method by using a neural computer is described. Phase differences $\Delta\theta_1, \Delta\theta_2, \Delta\theta_3, \ldots, \Delta\theta_n$ between signals taken in time series are inputted to the input layer of the neural computer. In this case, an output torque is outputted from the output layer. In an initial stage as shown in FIG. 42(a), because the linkage or coupling between each layer is fairly uniform, a precise output torque cannot be obtained. However, as shown in FIG. 42(b), through a process of having the neural computer learn correct output torques, the linkage between each layer can be optimized so that a correct output torque can be obtained. In other words, by giving the neural computer reference output torques in advance for learning, a subsequent output torque can be obtained without obtaining a f(Δθcr). In addition, because of parallel computation of each signal, computation of the output torque can be completed in a shorter period of time.

Figure 43:
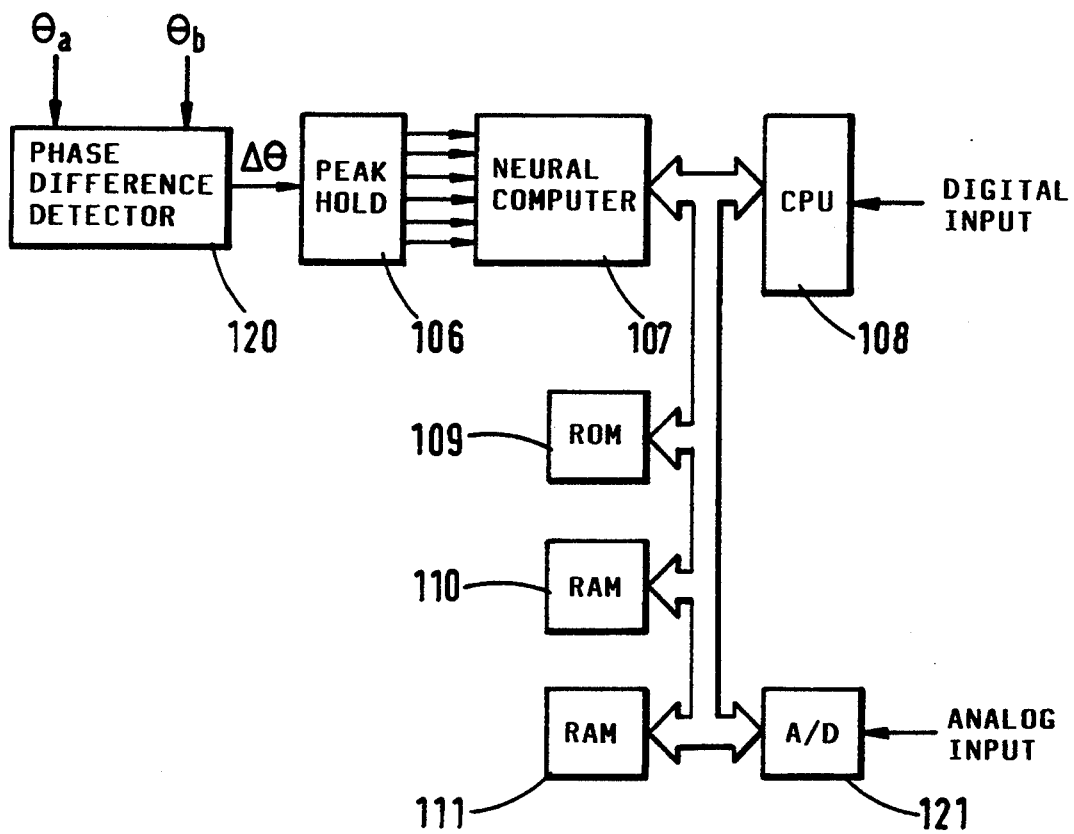
FIG. 43 shows a block schematic diagram of a control device of this invention.

FIG. 43 shows an exemplary configuration of the present invention. The outputs θa and θ from two sensors are inputted to a circuit 120, wherein their phase difference Δθ is obtained. The phase difference Δθ is then inputted to a peak hold circuit 106, peak-held signals thereof are then fed to a neural computer 107. The peak hold circuit 106 is provided one for each input layer of the neural computer. Signals to be inputted to each input layer of the neural computer are given in time series. A sampling period is set from one to thirty degrees in terms of a crank rotation angle. A CPU 108 is provided for performing various operations which is connected to a ROM 109 for reading programs, a battery backed-up RAM 110 for storing learning parameters in the neural computer, a RAM 111 for executing programs and the like, and an A/D converter 121 to input analog data.

Figure 44:
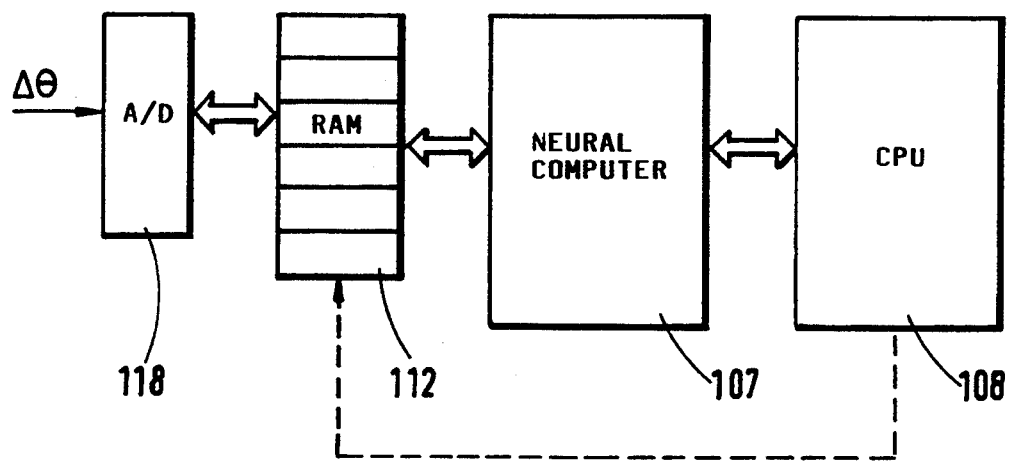
FIG. 44 shows in block schematic form another embodiment of a control device of this invention.

Another embodiment of the present invention is shown in FIG. 44. A phase difference signal is converted to a digital signal in an A/D converter 118. The converted digital signal is then stored in a RAM 112, wherein A/D converted values are stored in a time series order in the RAM memory cells. The data stored in the RAM 112 is inputted to the neural computer 107 and fetch commands to the RAM 112 to read data in time series order are controlled by the CPU 108. Such a configuration can be made compact in size because there is no need for a peak hold circuit to fetch data as required in the arrangement of FIG. 43. In addition, because of digitalized signals, they can be readily processed.

Figure 45:
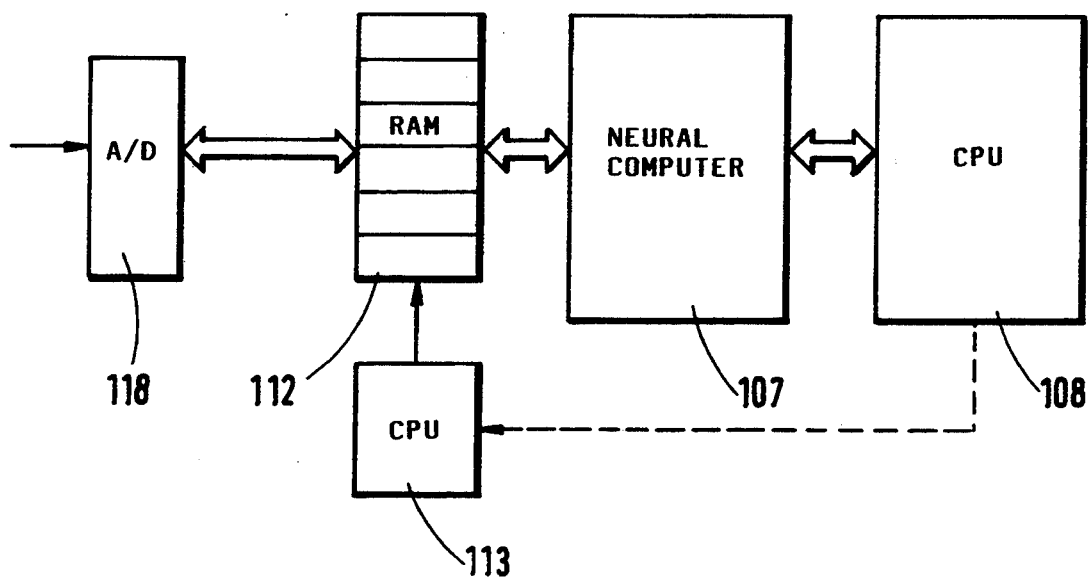
FIG. 45 shows in block schematic form a further arrangement of a control device of this invention.

FIG. 45 shows still another embodiment of the present invention, wherein fetch and read command of data to a RAM 112 is controlled, not by the main CPU 108, but by another CPU 113 (smaller in scale than the main CPU); for instance, 8 bits are sufficient in CPU 118 as against 83 bits of the main CPU 108. In such a configuration, because data can be fetched without the help of the main CPU, burdens such as interruption processing and the like can be reduced substantially in the main CPU.

Figure 46:
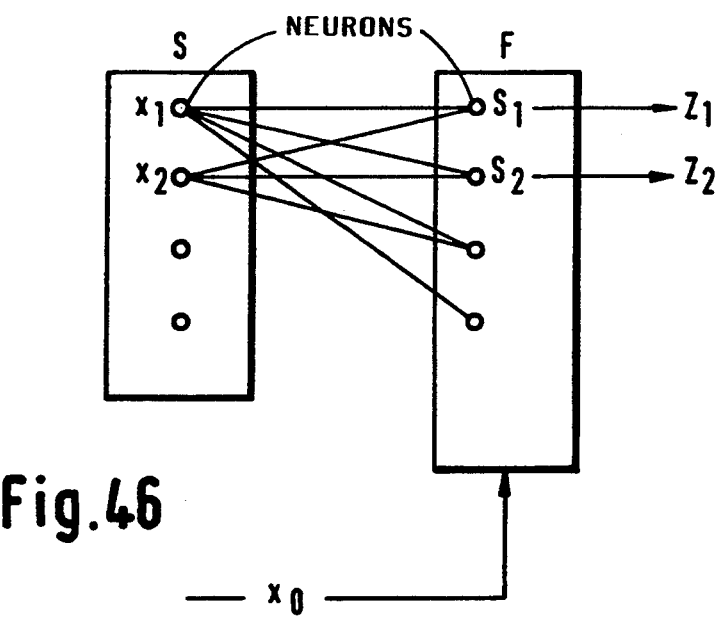
FIG. 46 shows in block schematic form the basic operation of a neural computer.

FIG. 46 shows the basic operation of a neural computer.

When the number of x signals to be processed by the neural computer is n $$X = (x_1, x_2, \ldots, x_n)$$

While receiving information on S, the neural computer changes its internal parameters to match with the configuration of S. This implies that the neural computer automatically generates a model of S internally, in which to process information S. A neural field F receiving external signals is supposed to be uniform in spatial configuration, and its relative coupling method to be of a mutually restraining type. In other words, when one neuron in the field generates a signal, the output from the neuron induces other neurals in its vicinity also to generate signals, but to restrain other neurons located a little remotely from generating signals.

Figure 47:
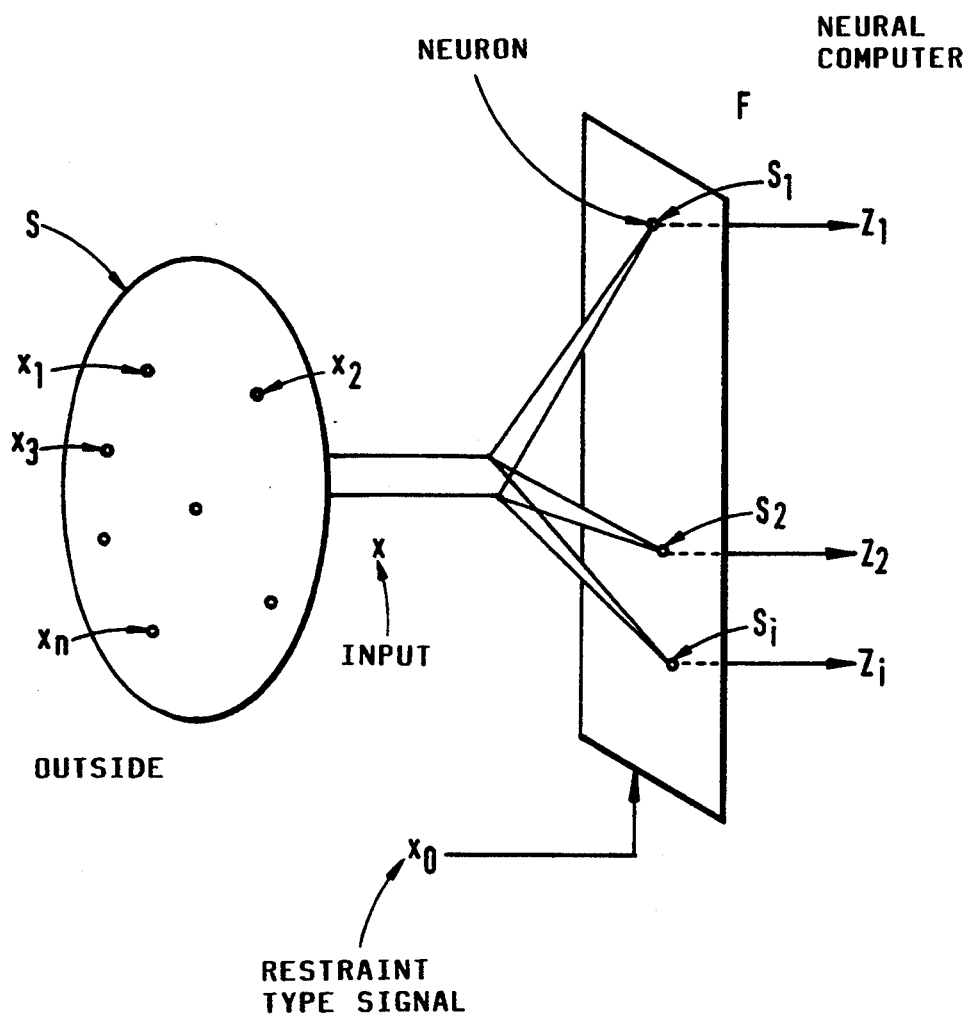
FIG. 47 is a sketch for indicating the basic operation of a neural computer.

In more detail, and referring to FIG. 47, each neuron, when it comes into contact with an input signal x, receives its signal through its coupling load vector S, consequently receiving an intensity of stimulation of a total inner product expressed as follows.

$$\vec{S} \cdot \vec{x} = \sum_{x=1}^{n} S_i x_i$$

For example, when an input signal is x, an intensity of the signal received at a first neuron is expressed as follows.

$$S_1 x_1 + S_1 x_2 + S_1 x_3 + S_1 x_4 + \ldots + S_1 x_n$$

where, $x = x(x_1, x_2, x_3, \ldots x_n)$

Similarly, an intensity of the signal received at a second neuron s expressed by $$S_2 x_1 + S_2 x_2 + S_2 x_3 + S_2 x_4 + \ldots + S_2 x_n$$

Then, an intensity of the signal received at an $i_{th}$ neuron will be $$S_i x_1 + S_i x_3 + S_i x_4 \ldots + S_i x_n$$

Further, when internal signals between neurons, and restraint signals are considered, the intensity of the signal received at the $i_{th}$ neuron can be rewritten as follows:

$$S_i \vec{x} - S_{oi} x_o + \Sigma W_{ij} Z_j$$

When this value exceeds a given quantity the neuron outputs an output signal. Assuming the responsive time constant of a neural to be τ, the following equation will be derived.

$$u_i \overline{\text{(after time } \tau)} \quad s_i \cdot \vec{x} - \bar{s}_{oi} x_o + \Sigma W_{ij} Z_j$$

$$\frac{du_i}{dt} = \frac{S_i \cdot x - S_{oi} x_o + \Sigma W_{ij} Z_j - u_j}{\tau}$$

$$\tau \frac{du_i}{dt} = -u_i + S_i \vec{x} - S_{oi} x_o + \Sigma W_{ij} Z_j$$

From the above statements, it is understood that an output torque Te can also be obtained from a phase difference Δθcr, if $W_{ij}$ in the neural computer is predetermined and optimized by obtaining the output torque during operation of an internal combustion engine such as by a torque sensor. The data of $W_{ij}$ obtained through learning is stored in a battery backup memory.

Figure 48:
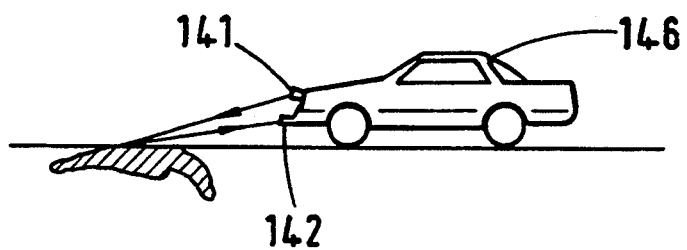
FIG. 48 shows use of the present invention for detecting obstacles in a road and road conditions.

A further use of the present invention on an automobile will now be described. On the front of an automobile, 146 shown in FIG. 48, is a light emitting device 141 forming a forward facing beam, and a photoreceptor 142 for receiving light rays emitted by device 141 after the rays have been scattered by a road. The light emitting device may be, for example, a laser or an infra-red diode and the photoreceptor may be a phototransistor or a photodiode.

Figure 49:
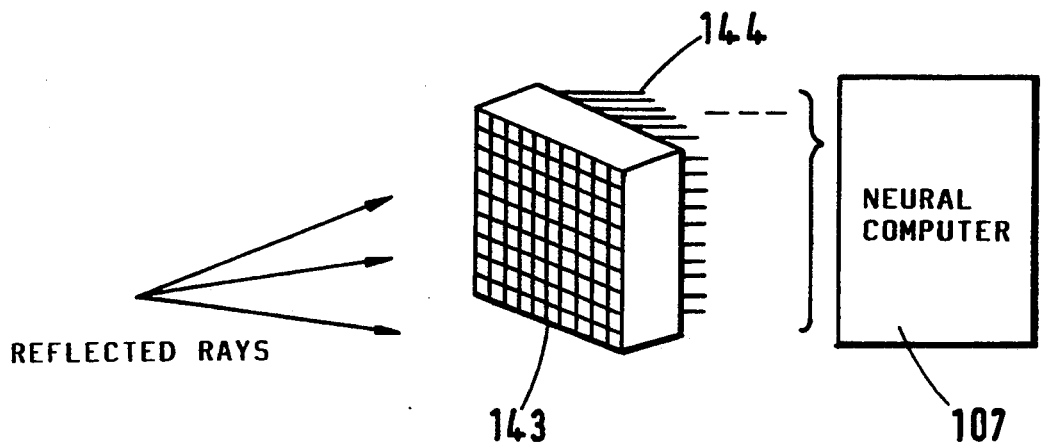
FIG. 49 shows in block schematic form integers used in the arrangement of FIG. 48.

A plurality of photoreceptors 144 may be arranged in a two-dimensional array as shown in FIG. 49 and signals from the photoreceptors 144 are applied to the input layer of the neural computer 107.

Figure 50:
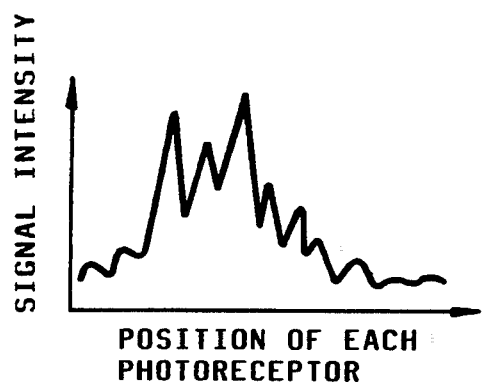
FIG. 50 shows in graphical form the output of a sensor used in the arrangements of FIGS. 48 and 49.

As shown in FIG. 50, signal intensity varies according to the location of each photoreceptor. Further, signal intensity patterns vary, for instance, in dependence upon road conditions (dry, wet or frozen etc.), or the size or shape of an obstacle. In other words, through processing received data in the neural computer as above described, sizes of obstacles and various road conditions can be detected very quickly.

With regard to various road conditions, these are predefined to the neural computer for processing and learning so as to optimize weighting factors and threshold values in the neural computer. By such means, the existence of an obstacle and road conditions can be comprehended so as to issue an early warning to a driver in good time or alternatively to optimize operational parameters.

Figure 51:
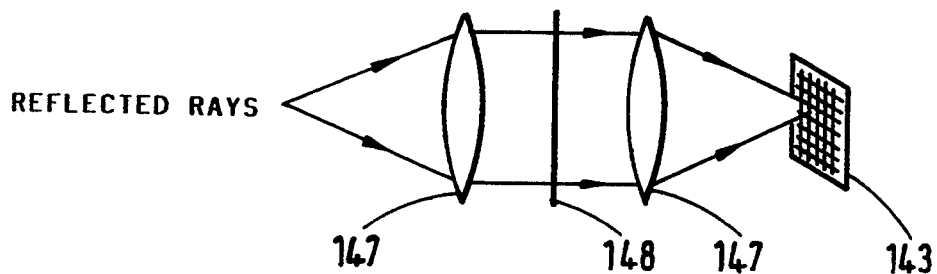
FIG. 51 shows another apparatus for detecting road conditions.

FIG. 51 shows another apparatus for detecting the road conditions. A laser beam (not shown) emitted from the front of an automobile is reflected from the road and is received onto a detector 143 through lenses 147 and filters 148 which extrapolates the required light wavelength from extraneous light so as to thereby examine the shape and intensity of a reflected light ray. Based on the data it is possible to find out road surface conditions and slant or curvature of the road in front of the automobile.

Figure 52:
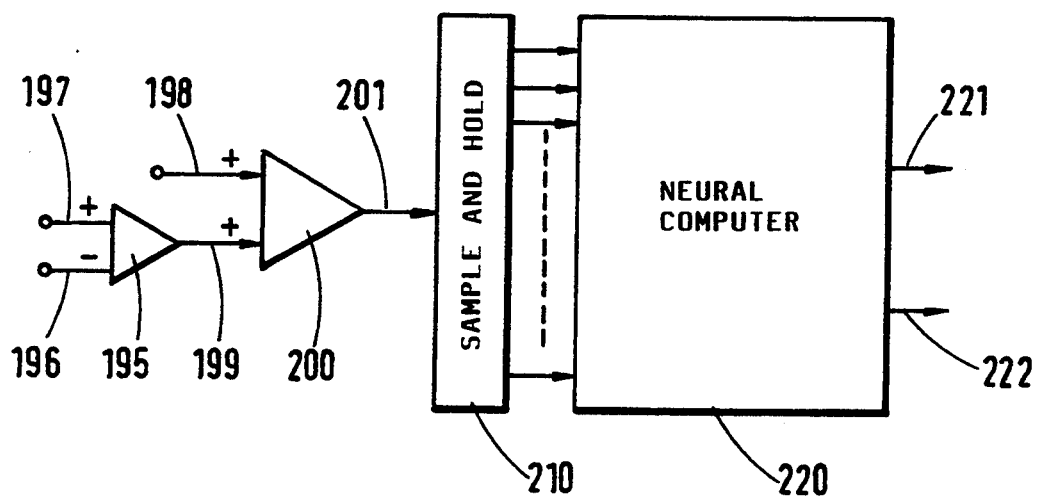
FIG. 52 shows in block schematic form an apparatus using the present invention for detecting engine knocking signals.

The above described methods referring to FIGS. 48–51 are based on a process in which a laser beam from a light emitting device is reflected on the road, scattered, and is detected by a photoreceptor. But if a high sensitivity CCD array is used as a photoreceptor, related information can be obtained using external light sources only. The use of this invention with a knocking sensor is shown in FIG. 52 in which an adder 200 receives a signal 198 (for instance, a knocking signal) and another signal 199, for instance, indicative of a relative torsional angle between the front ($\theta_1$) and rear ($\theta_2$) ends of a crankshaft, which are inputted at terminals 196, 197 and a difference signal $\Delta\theta cr$ outputted from differential amplifier 195. The signal 199 is obtained by subtracting a crankshaft frontal end angle signal 196 and a crankshaft rear end (ring gear end) angle signal 197 in a subtractor 195. Thereby, the signal 199 is the torsional angle of the crankshaft, indicative of the engine output. Output 201 from the adder 200 is inputted to a sample and hold circuit 210, wherein time series signals are transformed into spatial multi-variable series to be inputted to the input layer of a neural computer 220. An output 221 from the neural computer 220 is a knocking signal and an output 222, is an engine output signal.

Although in this embodiment, two outputs are detected by using three input signals, it is also possible to obtain two outputs by using two input signals or more output signals if more than three input signals are applied.

Figure 53:
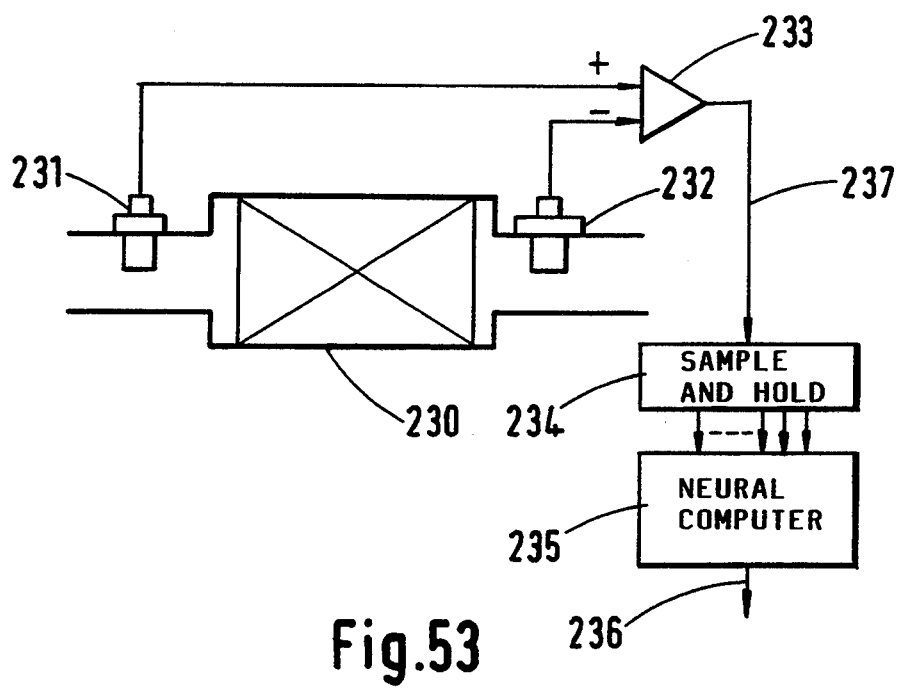
FIG. 53 shows in block schematic form yet another arrangement of the present invention used to determine deterioration of a catalyst in a catalytic converter.

FIG. 53 shows an embodiment of the present invention as applied to the measurement of deterioration of a catalyst 230 in a catalytic converter. Outputs from an $O_2$ sensor 231 in the up-stream side of the catalyst 230 and another $O_2$ sensor 232 in the down-stream side of the catalyst are inputted to a subtractor 233 and the output 237 thereof is then inputted to a sample and hold circuit 234. Output from circuit 234 is inputted to a neural computer 235 for computation therein, so as to yield a catalyst deterioration output 236.

Figure 54:
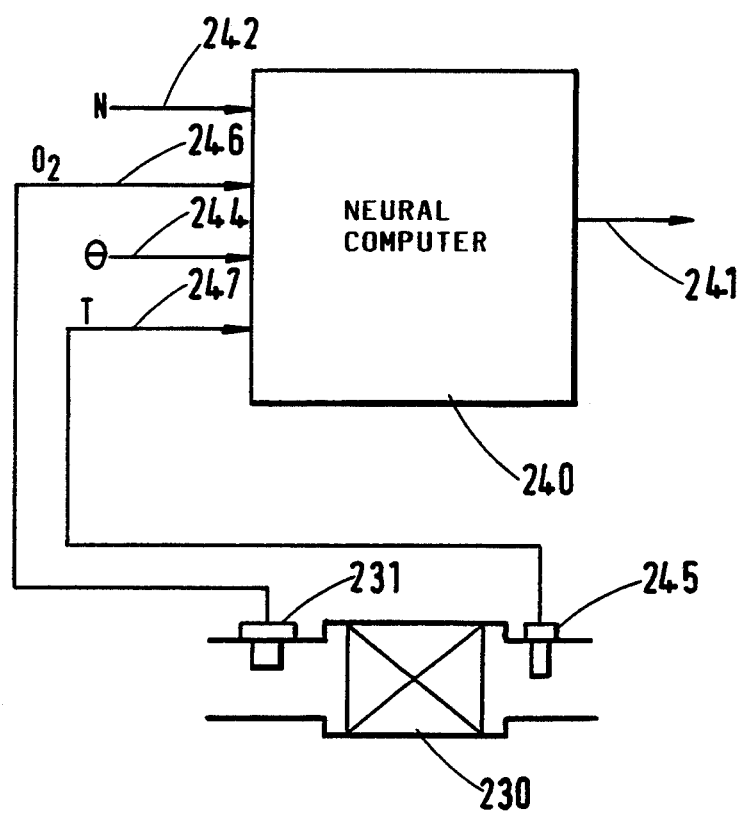
FIG. 54 shows another embodiment of this invention used to measure catalyst deterioration.

FIG. 54 shows another embodiment of the present invention applied to the measurement of catalyst deterioration. A neural computer 240 has an input signal on line 246 from an $O_2$ sensor 231 positioned in the upstream of the catalyst, a signal on line 247 from another $O_2$ sensor 245 in the down-stream from the catalyst, an engine revolution signal 242, and a throttle opening signal on line 244. The neural computer outputs a catalyst deterioration signal on line 241. Instead of the throttle opening signal 244 employed in this embodiment, an engine intake air flow signal or a suction pipe pressure may be used.

Figure 55:
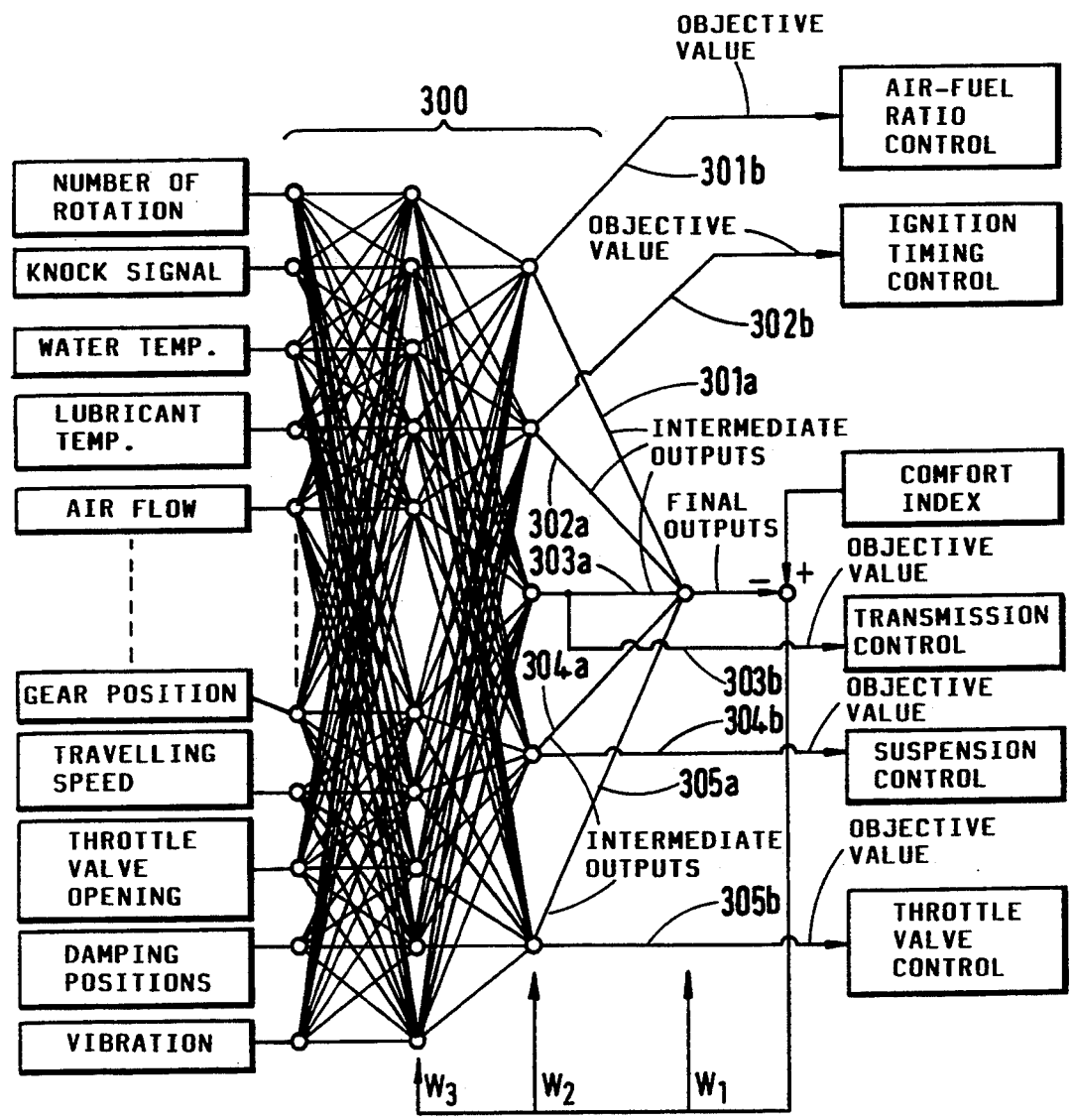
FIG. 55 shows still another embodiment of this invention in block schematic form.

FIG. 55 shows still another embodiment of the present invention. Into a neural network 300 is inputted automotive information such as the number of engine revolutions, knock signals, water temperature, lubricant temperature, air flow, gear position, travelling speed, throttle valve opening, damping positions of suspensions, vibration of car body, etc. Also in the neural network 300, there is provided a final output mode. When there arises a difference between the final output and the comfort index set up at discretion by an operator, weighting factors W1, W2 and W3 are changed so as to match the final output with the comfort index. Intermediate outputs 301a–305a are inputted to the final stage of the neural network, while intermediate outputs 301b–305b are inputted as objective values respectively to an air-fuel ratio control, an ignition timing control, a transmission control, a suspension control, and a throttle valve control. As described above, when an operator inputs a comfort index suited to his own preference, each object value of respective controls is changed so as to achieve a driving performance or mode coordinated to his preference.

Figure 56:
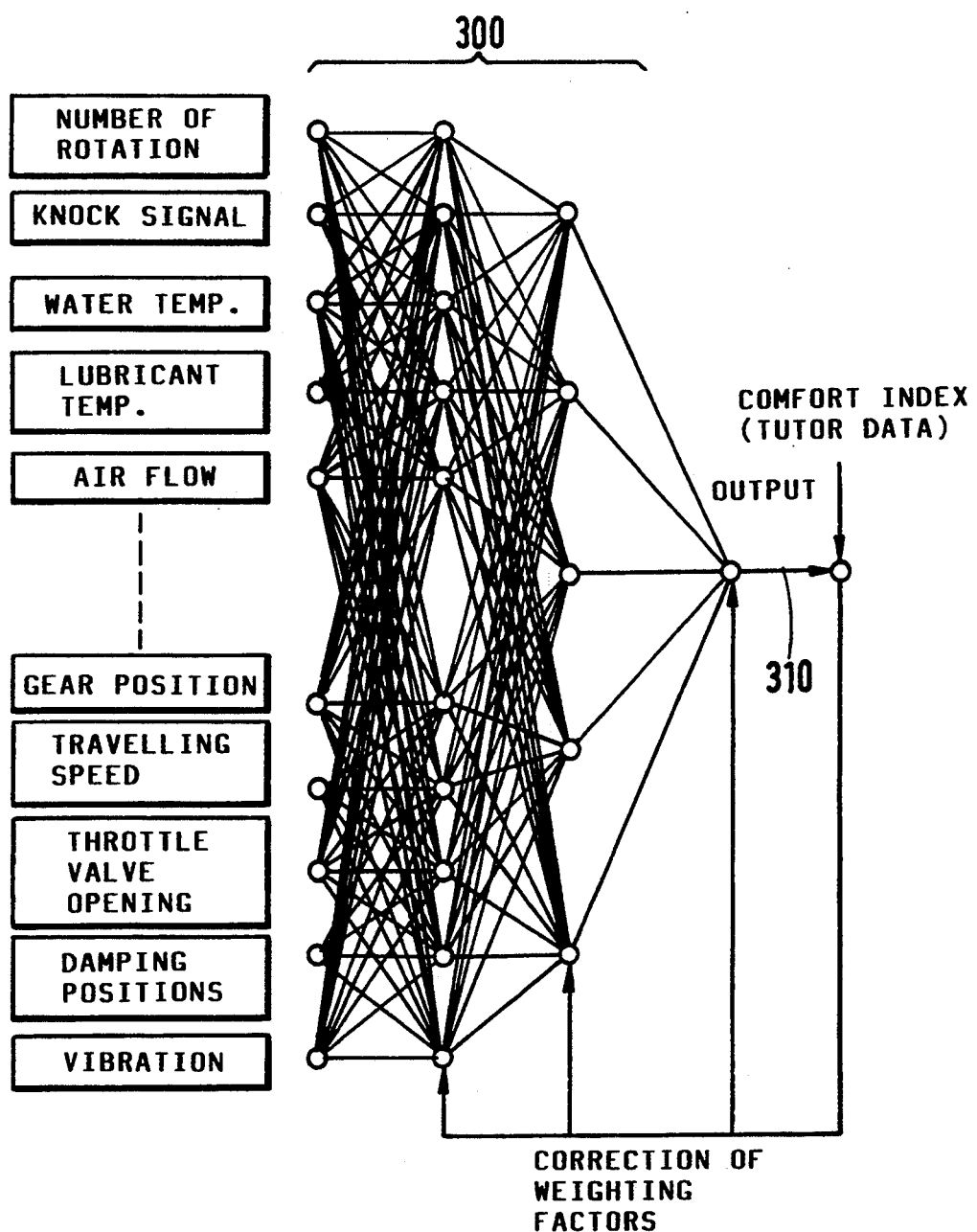
FIG. 56 shows a still further embodiment of the present invention in block schematic form.

FIG. 56 shows a still further embodiment of the present invention, which can be used as a detector of the comfort index. Into a neural network 300 are inputted the number of engine revolutions, knock signals, water temperature, lubricant temperature, air flow, gear position, travelling speed, throttle valve opening, damping positions of suspension, and vibration of car body. The output from the neural network 300 is compared with a comfort index as tutor data throughout a learning process by varying weighting factors. When the learning process is completed, the output 310 indicates the value of the comfort index. When another driver indicates his own preference of comfort index as tutor data, weighting factors are varied to yield different comfort index suited to his preference.

In the present invention, output signals from one or more sensors after being converted to a plurality of signals, are inputted into an input layer of hierarchical neural elements, which input signals therein are weighted to yield output signals reflecting weighting factors. Further, the yielded output signals are used as parameters to determine control parameters for one or more automobile control actuators, thereby significantly improving precision in extracting sensor information.

Also, by use of the present invention, a driving performance or characteristic suited to a driver's preference or sensibilities can be attained because of an arrangement wherein output signals from a plurality of sensors are inputted to the input layer of hierarchical neural elements and based on the result of the final output from the neural elements, control actuators of an automobile are controlled.

It is to be understood that the invention has been described with reference to exemplary embodiments, and modifications may be made without departing from the spirit and scope of the invention as defined in the appended claims.

We claim:

1. A control device for an automobile having an engine knock sensor for detecting engine knock of said automobile engine, and an actuator for controlling said engine knock, said control device including transformation means for transforming signals from said knock sensor into a spatial multi-variable signal consisting of plural bits and to apply said spatial multi-variable signal to a hierarchical group of neural elements, each element providing an output $O_1$ where $$O_i = f\left(\sum_j W_{ij}O_j\right) - \theta$$

where $O_j$ are inputs, $W_{ij}$ are weighting factors and $\theta$ is a threshold,
and further including modifying means for adaptively controlling the internal parameters of the neural elements by comparison with actual knock data, and a control means for receiving an output signal from said group of neural elements for controlling said actuator.

2. A control device as claimed in claim 1 wherein said modifying means includes means for varying weighting values of each neural element in the group of neural elements to provide said desired parameter.

3. A control device as claimed in claim 1 wherein the modifying means includes a threshold modifying means for modifying a threshold value of said neural element in said hierarchical group of neural elements to provide said desired parameter.

4. A control device as claimed in claim 1 wherein said group of neural elements comprises an input layer of neural elements, an intermediate layer of neural elements and an output layer of neural elements, and difference means are connected to each neural element of said output layer of neural elements, said difference means also being connected to receive an input signal to an associated neural element of said input layer of neural elements.

5. A control device as claimed in claim 1 wherein a controller is provided for providing predetermined, desired, sensor values to said hierarchical group of neural elements and an error feedback means is provided for receiving signals from said controller and from said at least one sensor, said error feedback means modifying the output of the neural elements in said hierarchical group of neural elements whereby the difference in signals applied to said error feedback means are brought to zero.

6. A control device as claimed in claim 5 wherein the at least one sensor comprises a light emitter and a light detector array for supplying signals to said hierarchical group of neural elements.

7. A control device as claimed in claim 1 wherein a plurality of sensors are provided and a plurality of control means are provided, and driver actuable means are provided for controlling the output of the hierarchical group of neural elements whereby operational parameters of the automobile may be varied in dependence upon said drivers preference.

8. A control device for an automobile having an engine knock sensor for detecting engine knock of said automobile engine, and an actuator for controlling said engine knock, said control device including
(a) transformation means for transforming time series signals from said knock sensor into a spatial multi-variable signal consisting of plural bits, said transformation means having a sampling and holding means which starts sampling and holding on the basis of a sample start signal which is related to an instant of ignition and carries out the sampling and holding process for a predetermined period of time, whereby n old samples are replaced by n new samples at each predetermined period of time, and to apply said spatial multi-variable signal to
(b) an input layer of n neural elements of a hierarchical group of neural elements, each element providing an output $O_1$ where $$O_i = f\left(\sum_j W_{ij}O_j\right) - \theta$$

where $O_j$ are inputs, $W_{ij}$ are weighting factors and $\theta$ is a threshold,
(c) means for measuring actual knock data and for producing an output signal representative thereof,
(d) modifying means for adaptively controlling the internal parameters of the neural elements by comparison with the actual knock data measuring means output signal, and
(e) control means for receiving an output signal from said group of neural elements for controlling said actuator.

9. A control device as claimed in claim 8 wherein said modifying means includes means for varying weighting values of each neural element in the group of neural elements to provide said desired parameter.

10. A control device as claimed in claim 8 wherein the modifying means includes a threshold modifying means for modifying a threshold value of said neural element in said hierarchical group of neural elements to provide said desired parameter.

11. A control device as claimed in claim 8 wherein said group of neural elements comprises said input layer of neural elements, an intermediate layer of neural elements and an output layer of neural elements, and difference means are connected to each neural element of said output layer of neural elements, said difference means also being connected to receive an input signal to an associated neural element of said input layer of neural elements.

12. A control device as claimed in claim 8 wherein a controller is provided for providing predetermined, desired, sensor values to said hierarchical group of neural elements and an error feedback means is provided for receiving signals from said controller and from said at least one sensor, said error feedback means modifying the output of the neural elements in said hierarchical group of neural elements whereby the difference in signals applied to said error feedback means are brought to zero.

13. A control device as claimed in claim 12 wherein the at least one sensor comprises a light emitter and a light detector array for supplying signals to said hierarchical group of neural elements.

14. A control device as claimed in claim 8 wherein a plurality of sensors are provided and a plurality of control means are provided, and driver actuable means are provided for controlling the output of the hierarchical group of neural elements whereby operational parameters of the automobile may be varied in dependence upon said drivers preference.

15. A control device for an automobile having at least one sensor adapted to detect an operational state of said automobile, and an actuator for controlling said operational state, said control device including:

(a) a transformation means for transforming signals in time series from said at least one sensor into a spatial multi-variable signal, said transformation means having a sampling and holding means which starts sampling and holding on the basis of a sample hold start signal relating to an instant of ignition as its starting point, and carries out the sampling and holding process for a predetermined period of time, the spatial multi-variable signal consisting of plural bits (12a, 12b, 12c, - - - 12n) in sequence of input order and being renewed at each predetermined period of time so that n old samples are replaced by n new samples at each predetermined period of time;

(b) a hierarchical group of neural elements having an input layer of n neural elements for receiving said spatial multi-variable signal;

(c) modifying means for adaptively controlling the neural elements in accordance with a desired parameter; and (d) a control means for receiving an output signal from said group of neural elements for controlling said actuator.

16. A control device as claimed in claim 15 wherein said modifying means includes means for varying weighting values of each neural element in the group of neural elements to provide said desired parameter.

17. A control device as claimed in claim 15 wherein the modifying means includes a threshold modifying means for modifying a threshold value of said neural element in said hierarchical group of neural elements to provide said desired parameter.

18. A control device as claimed in claim 15 wherein a plurality of sensors are provided for detecting an operational state of respective components in an automobile and at least one actuator is provided for controlling each said component of said automobile.

19. A control device as claimed in claim 18 wherein there is provided a knock sensor connected to apply signals therefrom to said transformation means, said group of neural elements comprising;

(e) said input layer of neural elements;

(f) an intermediate layer of neural elements;

(g) an output of neural elements;

(h) difference means connected to each neural element of said output layer of neural elements; and (i) said difference means also being connected to receive an input signal to an associated neural element of said input layer of neural elements.

20. A control device as claimed in claim 15 wherein:

a controller is provided for providing predetermined, desired, sensor values to said hierarchical group of neural elements; and an error feedback means is provided for receiving signals from said controller and from said at least one sensor, said error feedback means being adapted to modify the output of the neural elements in said hierarchical group of neural elements whereby the difference in signals applied to said error feedback means are brought to zero.

21. A control device as claimed in claim 20 wherein the at least one sensor comprises a light emitter and a light detector array adapted to supply signals to said hierarchical group of neural elements.

22. A control device as claimed in claim 15 wherein a plurality of sensors are provided and a plurality of control means are provided, and driver actuable means are provided adapted to control the output of the hierarchical group of neural elements whereby operational parameters of the automobile may be varied in dependence upon said drivers preference.

* * * * *